(12) United States Patent  (10) Patent No.: US 8,578,037 B2
Nelson et al.  (45) Date of Patent: **\*Nov. 5, 2013**

(54) AIRCRAFT DATA SERVICES

(75) Inventors: Eric A. Nelson, Bellevue, WA (US); Michael B. O'Meara, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/558,935

(22) Filed: Jul. 26, 2012

(65) Prior Publication Data

US 2012/0303826 A1  Nov. 29, 2012

Related U.S. Application Data

(60) Continuation of application No. 11/143,738, filed on Jun. 3, 2005, now Pat. No. 8,250,221, which is a division of application No. 09/884,724, filed on Jun. 19, 2001, now Pat. No. 7,177,939, which is a continuation-in-part of application No. 09/312,011, filed on May 14, 1999, now Pat. No. 6,760,778.

(51) Int. Cl.
   *G06F 15/16* (2006.01)
(52) U.S. Cl.
   USPC .......................................... 709/228; 709/230
(58) Field of Classification Search
   None
   See application file for complete search history.

(56) References Cited

U.S. PATENT DOCUMENTS

| | | |
|---|---|---|
| 4,642,775 A | 2/1987 | Cline et al. |
| 5,179,571 A | 1/1993 | Schilling |
| 5,222,128 A | 6/1993 | Daly et al. |
| 5,265,024 A | 11/1993 | Crabill et al. |
| 5,371,782 A | 12/1994 | Casey et al. |
| 5,381,140 A | 1/1995 | Kuroda et al. |
| 5,412,660 A | 5/1995 | Chen et al. |
| 5,438,610 A | 8/1995 | Bhagat et al. |
| 5,448,768 A | 9/1995 | Zinser |
| 5,459,469 A | 10/1995 | Schuchman et al. |
| 5,473,679 A | 12/1995 | La Porta et al. |
| 5,524,146 A | 6/1996 | Morrisey et al. |
| 5,524,272 A | 6/1996 | Podowski et al. |
| 5,530,945 A | 6/1996 | Chavez, Jr. et al. |
| 5,533,027 A | 7/1996 | Akerberg et al. |
| 5,555,446 A | 9/1996 | Jasinski |
| 5,557,656 A | 9/1996 | Ray et al. |

(Continued)

FOREIGN PATENT DOCUMENTS

| | | |
|---|---|---|
| EP | 0828353 | 3/1998 |
| EP | 0890907 | 1/1999 |

(Continued)

OTHER PUBLICATIONS

Lemme, Peter et al., "Email from an Aircraft: High Speed and Low Cost?", www.airfax2000.com/wp/0306200.asp, pp. 1-3, Mar. 2000.

(Continued)

*Primary Examiner* — Patrice Winder
(74) *Attorney, Agent, or Firm* — Woodcock Washburn LLP

(57) ABSTRACT

A method and system provide efficient, flexible, and convenient data communication services over public wireless systems. The system includes a data communication server, having a plurality of interface units, for facilitating data communication between a moving object and one or more ground terminals via a radio communication path. The data communication server establishes the radio communication path over one of a plurality of wireless data networks including packet data networks and satellite data networks and preferably includes a pre-determined software architecture.

16 Claims, 21 Drawing Sheets

(56) References Cited

U.S. PATENT DOCUMENTS

| | | | |
|---|---|---|---|
| 5,557,658 | A | 9/1996 | Gregorek et al. |
| 5,577,103 | A | 11/1996 | Foti |
| 5,579,379 | A | 11/1996 | D'Amico et al. |
| 5,583,917 | A | 12/1996 | Jonsson |
| 5,621,734 | A | 4/1997 | Mann et al. |
| 5,627,546 | A | 5/1997 | Crow |
| 5,627,548 | A | 5/1997 | Woo et al. |
| 5,657,032 | A | 8/1997 | Liechty et al. |
| 5,657,373 | A | 8/1997 | Hermansson et al. |
| 5,714,948 | A | 2/1998 | Farmakis et al. |
| 5,760,819 | A | 6/1998 | Sklar et al. |
| 5,798,726 | A | 8/1998 | Schuchman et al. |
| 5,805,633 | A | 9/1998 | Uddenfeldt |
| 5,805,683 | A | 9/1998 | Berberich |
| 5,815,810 | A | 9/1998 | Gallant et al. |
| 5,850,445 | A | 12/1998 | Chan et al. |
| 5,862,471 | A | 1/1999 | Tiedemann, Jr. et al. |
| 5,862,490 | A | 1/1999 | Sasuta et al. |
| 5,878,215 | A | 3/1999 | Kling et al. |
| 5,881,235 | A | 3/1999 | Mills |
| 5,884,157 | A | 3/1999 | Karmi |
| 5,887,258 | A | 3/1999 | Lemozit et al. |
| 5,890,079 | A | 3/1999 | Levine |
| 5,894,596 | A | 4/1999 | Hayes, Jr. |
| 5,915,214 | A | 6/1999 | Reece et al. |
| 5,923,743 | A | 7/1999 | Sklar |
| 5,940,381 | A | 8/1999 | Freeburg et al. |
| 5,946,618 | A | 8/1999 | Agre et al. |
| 5,950,129 | A | 9/1999 | Schmid et al. |
| 5,969,318 | A | 10/1999 | Mackenthun |
| 5,973,722 | A | 10/1999 | Wakai et al. |
| 5,974,349 | A | 10/1999 | Levine |
| 5,983,227 | A | 11/1999 | Nazem et al. |
| 5,990,928 | A | 11/1999 | Sklar et al. |
| 5,991,596 | A | 11/1999 | Cunningham et al. |
| 5,995,725 | A | 11/1999 | Dillon |
| 6,014,557 | A | 1/2000 | Morton et al. |
| 6,014,561 | A | 1/2000 | Molne |
| 6,014,606 | A | 1/2000 | Tu |
| 6,034,950 | A | 3/2000 | Sauer et al. |
| 6,038,223 | A | 3/2000 | Hansson et al. |
| 6,038,456 | A | 3/2000 | Colby et al. |
| 6,047,176 | A | 4/2000 | Sakamoto et al. |
| 6,061,562 | A | 5/2000 | Martin et al. |
| 6,064,887 | A | 5/2000 | Kallioniemi et al. |
| 6,078,805 | A | 6/2000 | Scott |
| 6,088,598 | A | 7/2000 | Marsolais |
| 6,088,717 | A | 7/2000 | Reed et al. |
| 6,112,078 | A | 8/2000 | Sormunen et al. |
| 6,138,016 | A | 10/2000 | Kulkarni et al. |
| 6,147,980 | A | 11/2000 | Yee et al. |
| 6,173,159 | B1 | 1/2001 | Wright et al. |
| 6,173,332 | B1 | 1/2001 | Hickman |
| 6,181,990 | B1 | 1/2001 | Grabowsky et al. |
| 6,201,797 | B1 | 3/2001 | Leuca et al. |
| 6,212,377 | B1 | 4/2001 | Dufour et al. |
| 6,215,811 | B1 | 4/2001 | Yuen |
| 6,219,694 | B1 | 4/2001 | Lazaridis et al. |
| 6,240,513 | B1 | 5/2001 | Friedman et al. |
| 6,249,913 | B1 | 6/2001 | Galipeau et al. |
| 6,269,243 | B1 | 7/2001 | Corbefin et al. |
| 6,285,878 | B1 | 9/2001 | Lai |
| 6,292,835 | B1 | 9/2001 | Huang |
| 6,308,045 | B1 | 10/2001 | Wright et al. |
| 6,332,077 | B1 | 12/2001 | Wu et al. |
| 6,404,769 | B1 | 6/2002 | Kapoor |
| 6,463,270 | B1 | 10/2002 | Chang et al. |
| 6,477,152 | B1 | 11/2002 | Hiett |
| 6,529,706 | B1 | 3/2003 | Mitchell |
| 6,636,721 | B2 | 10/2003 | Threadgill et al. |
| 6,646,998 | B1 | 11/2003 | Rasanen |
| 6,675,208 | B1 | 1/2004 | Rai et al. |
| 6,760,757 | B1 | 7/2004 | Lundberg et al. |
| 6,760,778 | B1 | 7/2004 | Nelson et al. |
| 6,785,712 | B1 | 8/2004 | Hogan et al. |
| 6,795,408 | B1 | 9/2004 | Hiett |
| 7,020,708 | B2 | 3/2006 | Nelson et al. |
| 7,035,634 | B2 | 4/2006 | Mead et al. |
| 7,177,939 | B2 | 2/2007 | Nelson et al. |
| 7,194,523 | B2 | 3/2007 | Nelson et al. |
| 8,250,221 | B2 | 8/2012 | Nelson et al. |
| 2001/0041553 | A1 | 11/2001 | Chang et al. |
| 2002/0032006 | A1 | 3/2002 | Nair et al. |
| 2002/0072389 | A1 | 6/2002 | Ward et al. |
| 2003/0003872 | A1 | 1/2003 | Brinkley et al. |
| 2003/0041155 | A1 | 2/2003 | Nelson et al. |
| 2003/0055975 | A1 | 3/2003 | Nelson et al. |
| 2004/0193732 | A1 | 9/2004 | Nelson et al. |
| 2005/0220055 | A1 | 10/2005 | Nelson et al. |
| 2007/0220109 | A1 | 9/2007 | Nelson et al. |

FOREIGN PATENT DOCUMENTS

| | | |
|---|---|---|
| EP | 1017188 | 7/2000 |
| EP | 1209928 | 5/2002 |
| FR | 2788922 | 7/2000 |
| WO | WO 96/03846 | 2/1996 |
| WO | WO 00/14987 | 3/2000 |
| WO | WO 02/103931 | 12/2002 |
| WO | WO 02/103932 | 12/2002 |

OTHER PUBLICATIONS

Kerr, R.B., "Data communications management for the Boeing 777 airplane," IEEE Digital Avionics Systems Conference, pp. 51-56, Nov. 1995.

Perkins, C., "IP Mobility Support, Network working Group, Request for Comment: 2002", pp. 1-79, Oct. 1996.

International Search Report mailed Oct. 8, 2002 for PCT Application No. PCT/US02/19336, 5 pages.

International Search Report mailed Dec. 6, 2002 for PCT Application No. PCT/US02/19337, 3 pages.

| Property Name | Type | Allowable Value | Comment |
|---|---|---|---|
| Client Control Selectable Category (SCCatAvail) | List | Examples[4] are General Sports News, Major League Baseball, National Basketball Association, Men's College Basketball, Women's College Basketball, National Football League, College Football, National Hockey League, Golf, Tennis, Canadian Football League, Major League Soccer, Auto Racing. | This property item specifies the individual record types that will be available for the Client Control to display selectable items. Each Sports Scores item contains its own property and can also be (de)selected via the Server Control. The Client Control can only view and make selection decision on the ones that are selected (enabled) here. |
| Maximum Number of Client Selectable Category (SCMaxCatSel) | Int | 0–Number of Server Control Selected Category. Default: Number of Selected Category. | This property specifies the upper limit of how many sports scores categories the Client can select. (SCMaxCatSel is less or equal to the total number of SCCatAvail) |
| Maximum number of Client Connection (SCMaxConn) | Int | 0–256. Default: 16 | This property specifies how many call instances can be created. |
| Cost (SCCost) | char | 1–High, 0–Low. Default is 0. Numbers in ASCII | This parameter determines the permissible transmission type. 1–High is specified, overflow to SATCOM is allowed if NATS is not available. |
| Priority (SCPrio) | char | 1–High, 0–Low. Default is 0. Numbers in ASCII | This parameter determines the priority of the delivery. High priority job is placed ahead of the queue. Job with the same level of priority are processed on the FCFS basis. |

ADMINISTRATIVE PROPERTY FOR SPORTS SCORES

FIG.17

| Property Name | Type | Allowable Value | Comment |
|---|---|---|---|
| Category List (CCCatList) | List | Examples[5] are General Sports News, Major League Baseball, National Baseball Association, Men's College Basketball, Women's College Basketball, National Football League, College Football, National Hockey League, Golf, Tennis, Canadian Football League, Major League Soccer, Auto Racing. | This property describes the selectable sports score items. Each Sports Scores item contains its own property. Once the item is selected, the property of the item is displayed and can be modified by the user. Example of the sub-property item is the list of selectable teams to retrieve the sports scores for or the option to download images. |
| On-Demand Update (CCODUpdate) | Bool | True or False. Default: False | This property specifies weather query for the existing data available on the server or to get the latest scores from the GDG. |
| Cost (CCCost) | char | 1-High, 0-Low. Default is 0. Numbers in ASCII. Valid only when CCODUpdate is true. | This property determines the permissible transmission type. This overrides the Server side property and is only available to client control with privilege. |
| Priority (CCPrio) | char | 1-High, 0-Low. Default is 0. Numbers in ASCII. Valid only when CCODUpdate is true. | This parameter determines the priority of the delivery. This overrides the Server side property and is only available to client control with privilege. |

FIG.18  TABLE 2—CLIENT CONTROL PROPERTY FOR SPORTS SCORES API

| Property Name | Type | Allowable Value | Comment |
|---|---|---|---|
| Locator Database (RCDatabase) | List | Each record contains 4: Category, SQL Port, SQL Script Index, etc. | This item is a manifest of the locator database and contents are editable via this property. |
| Update Schedule (RCSchedule) | Char | 0-ADS own schedule, 1-Custom schedule, 2-No scheduled update. | ADS schedule is a special custom schedule that has been fine tuned for airtime. The Custom schedule allows the System Administrator to create his/her own schedule. No Schedule is used to disable the schedule update. The update is always on-demand. When Custom is chosen, a separate property describing tunable items is available for modification. |
| Update All (RCUpdateAll) | Bool | True or False. Default: False | This field, if is true, will instruct the Retriever to update all of the sports scores. This property is used along with the On-Demand Update Method. |
| Update List (RCUpdateList) | Bool | True or False. Default: False | This field, if is true, will instruct the Retriever to update the sports scores based on List describing below. This property is used along with the On-Demand Update Method and is mutually exclusive with RCUpdateAll. |
| Category List (RCCatList) | List | Examples are General Sports News, Major League Baseball, National Baseball Association, Men's College Basketball, Women's College Basketball, National Football League, College Football, National Hockey League, etc. | This property describes the sports scores items for retrieval. Each Sports Scores item contains its own property. This property is valid only if RCUpdateList is true. |

TABLE 3-RETRIEVER CONTROL PROPERTY FOR SERVER

FIG.19

| Method Name | Comment |
|---|---|
| Update Property (SMUpdateP) | This method allows the Admin SS to activate the properties specified in Section 5.1.1.1. |
| Update All (SMUpdate) | This privileged method is used to update all the sports scores records against the Cached Database on GDG. The associated property is described in Section 5.1.1.2. |
| Update List (SMUpdateList) | This method, combined with the property described in Section 5.1.1.2, is used to update only the records specified on the list. |

TABLE 4—SERVER SIZE METHODS FOR SPORTS SCORES API

FIG.20

| Method Name | Comment |
|---|---|
| Update List (CMUpdateList) | This method, combined with the property described in Section 5.1.1.2, is used to update only the records specified on the list against the database on the GDG. |
| Get List (CMGetList) | This method, combined with the property described in Section 5.1.1.2, is used to get only the records specified on the list against the database on ADS. |

TABLE 5-CLIENT SIDE METHODS FOR SPORTS SCORES API

FIG.21

AIRCRAFT DATA SERVICES

CROSS REFERENCE TO RELATED APPLICATIONS

The instant application is a continuation of, and claims priority to, U.S. patent application Ser. No. 11/143,738, filed Jun. 3, 2005. now U.S. Pat. No. 8,250,221. U.S. patent application Ser. No. 11/143,738 is a divisional application of U.S. patent application Ser. No. 09/884,724 filed Jun. 19, 2001. U.S. patent application Ser. No. 09/884,724 issued on Feb. 13, 2007, with U.S. Pat. No. 7,177,939. U.S. patent application Ser. No. 09/884,724 is a continuation-in-part of U.S. patent application Ser. No. 09/312,011 filed May 14, 1999. U.S. patent application Ser. No. 09/312,011 issued on Jul. 6, 2004, with U.S. Pat. No. 6,760,778. Each of U.S. patent application Ser. No. 11/143,738, U.S. patent application Ser. No. 09/884,724, U.S. Pat. No. 7,177,939, U.S. patent application Ser. No. 09/312,011, and U.S. Pat. No. 6,760,778, is incorporated by reference in its respective entirety herein.

BACKGROUND OF THE INVENTION

1. Field of the Invention

The present invention generally relates to wireless data communication services. It particularly relates to aircraft data communication services for users.

2. Background

Existing data communication services, particularly for aircraft systems, are generally limited to particular applications. These particular applications provided by non-public communication systems include ground flight recorder development, air traffic control operations, maintenance operations, position monitoring (e.g., global position satellite systems—GPS systems), collision avoidance, aircraft surveillance, weather radar, in-flight entertainment and other specific applications.

Existing data communication services for aircraft passengers are similarly limited to particular communication protocols and software/hardware systems, therein limiting convenience, affordability, and efficiency. These user communication protocols and systems include the Terrestrial Flight Telephone System (TFTS) and other private communication protocols and systems. These private systems require specialized, high-cost antenna equipment and power control systems or an inconvenient, invasive passenger ID assignment system to make use of public communication systems such as the cellular communication system or the public switched telephone network (PSTN), or require high-interference systems such as the existing amplitude modulation (AM) aircraft communication systems. Based on these existing limitations of non-public communication systems, a need exists to enable flexible, seamless data communication for aircraft systems using public wireless networks to increase affordability and efficiency.

SUMMARY OF THE INVENTION

The previously mentioned disadvantages are overcome by providing an efficient, flexible, and convenient method and system for providing data communication services for users. In accordance with embodiments of the present invention, a data communication server, including a plurality of interface units, facilitates data communication between a moving object and one or more ground terminals via a radio communication path. The data communication server establishes the radio communication path over one of a plurality of wireless data networks including terrestrial and satellite data networks and may include an object-oriented software architecture. Additional features of the present invention include personal data communication services for users and operational data services for the moving object.

Additional features of the present invention include a system for providing communication services including a data communication server, co-located with a moving object, for establishing a radio communication path between a moving object and a ground station, the data communication server including software architecture including software functional layers, the layers including a system resources layer, a system services layer, an application programming interface layer, and an application layer.

Further features of the present invention include a method of providing wireless data communication services including establishing a radio communication path between a moving object and a ground station using a communication server co-located with the moving object, the data communication server including software architecture including software functional layers, the layers including a system resources layer, a system services layer, an application programming interface layer, and an application layer.

BRIEF DESCRIPTION OF THE DRAWINGS

FIG. 17 is a property table of a communication software infrastructure for the data communication server in accordance with an embodiment of the present invention.

FIG. 18 is an alternative property table of a communication software infrastructure for the data communication server in accordance with an embodiment of the present invention.

FIG. 19 is an alternative property table of a communication software infrastructure for the data communication server in accordance with an embodiment of the present invention.

FIG. 20 is a method table of a communication software infrastructure for the data communication server in accordance with an embodiment of the present invention.

FIG. 21 is an alternative method table of a communication software infrastructure for the data communication server in accordance with an embodiment of the present invention.

DETAILED DESCRIPTION

System Components

Figure 1:
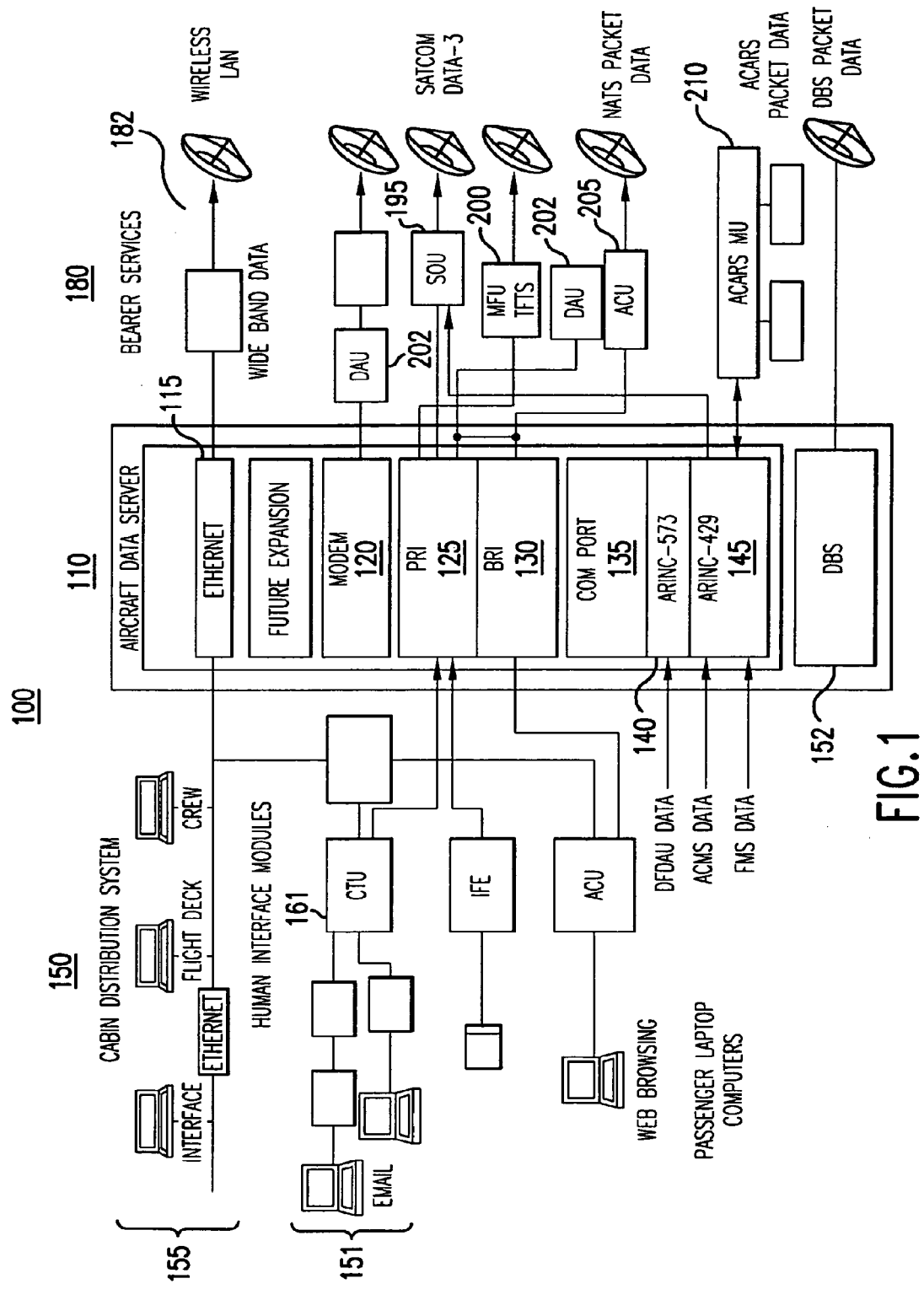
FIG. 1 is a block diagram showing a communication system architecture in accordance with an embodiment of the present invention.

FIG. 1 illustrates a representative data communication system architecture 100 in accordance with embodiments of the present invention. The system 100 includes an aircraft data server 110, cabin distribution system (CDS) 150, and bearer services systems components 180. The server 110 may be used as the main processor unit that provides programmable control over the routing, scheduling, and use of the system 100.

The CDS 150 provides access to the data services provided by the system 100 via the server 110. The CDS may include a plurality of components including a Human Interface Module (HIM) 155, a Passenger Access Server (PAS) or Terminal Server (TS) (not shown), and other components known to those of skill in the art for forming a Cabin Communications System (CCS). The HIMs 155 may be laptop computers with applications for logging data and interfacing with the server for data transfers. The PAS/TS, which may advantageously be a part of the server 110 or an external device, can provide dial-up connectivity to the passenger seats for data service access.

The bearer systems 180 can provide the server 110 with the data connectivity to a plurality of ground-based servers. The bearer systems 180 may include a plurality of components including an Airborne Communications Unit (ACU) 205, a Wireless Gate-link system (WGS) 182, a Satellite Data Unit (SDU) 195, and a Terrestrial Flight Telephone system (TFTS) 200. The WGS 182 may be, for example, a wireless LAN transceiver (as shown in FIG. 1) based on the IEEE 802.11 specifications which can allow transfer of high-speed data to the server 110 in the airport when the aircraft (moving object) is on the ground. The ACU may act as the gateway to a ground-based data center via the North American Terrestrial System (NATS) network. Although the present invention is described with reference to the NATS network, the NATS network is solely exemplary and alternative communication networks may be used for providing air-to-ground data communication services.

The SDU may provide access a Satellite Communications (SATCOM) Satellite Bearer Service. The TFTS is used to access the European land-line telephone network.

System 100 may include a plurality of components to provide higher data bandwidth and passenger access technology for facilitating data applications, examples being Internet Web browsing and email retrieval. These components include Direct Broadcast Service (DBS) satellite decoder 152, passenger cabin dial-up access system 151, and the WGS 182. Other components of system 100 can help facilitate data communications over the existing NATS data network.

The server 110 may include a CPU (not shown) comprising, for example, an Intel Pentium Pro, or equivalent processor system. The CPU provides multiple functions including, for example, interfacing various applications for data storage and retrieval and managing various data communications interfaces for data transfer to the ground-based servers.

The server 110 may include a plurality of interface units for interconnecting to various data networks. These interface units may comprise a plurality of discrete I/O boards or a single integrated board. Alternatively, the server 110 may include commercial off-the-shelf (COTS) network cards to provide data communications services for the system 100.

The plurality of interface (I/O) units may include an Ethernet interface unit 115, modem 120, communications (COM) port 135, Integrated Services Digital Network (ISDN) Basic Rate Interface (BRI) port 130, Primary Rate Interface (PRI) port 125, ARINC-429 (Aeronautical Radio, Inc.) bus interface unit 145, and ARINC-573 bus interface unit 140. The Ethernet unit 115 may include ports for interconnection to the HIMs 155 and to the external terminal station (TS), and may be used to connect to the wireless local area network (LAN) transceiver 182 providing a high-speed data path to ground terminals while the aircraft (moving object) is on the ground. Alternatively, a COTS Ethernet card attaching to an external hub (not shown) may be used.

The plurality of interface (I/O) units may include an Ethernet interface unit 115, modem 120, communications (COM) port 135, Integrated Services Digital Network (ISDN) Basic Rate Interface (BRI) port 130, Primary Rate Interface (PRI) port 125, ARINC-429 (Aeronautical Radio, Inc.) bus interface unit 145, and ARINC-573 bus interface unit 140. The Ethernet unit 115 may include ports for interconnection to the HIMs 155 and to the external terminal station (TS), and may be used to connect to the wireless local area network (LAN) transceiver 182 providing a high-speed data path to ground terminals while the aircraft (moving object) is on the ground. Alternatively, a COTS Ethernet card attaching to an external hub (not shown) may be used.

The PRI port 125 and BRI port 130 allow users (passengers) to establish dial-up internet protocol (IP) connections, via the CDS 150, when the system 100 offers Web browsing, email retrieval, and other passenger-related data services. The BRI port 130 may also be used as one of the system 100 link options when operated in the packet data mode. This mode is entered when a call is established between the server 110 and the ACU 205, and the bearer channel (B-channel) is operated in 64-Kbps unrestricted mode. Once the call setup is completed, data is transferred without alteration allowing datalink protocols, an example being Point-to-Point Protocol (PPP, RFC-1548), to be used to encapsulate the IP packets sent to and from the ACU. This mode may also be referred to as the transparent bearer service.

The ARINC-429 bus interface 145 can be used by the server 110 to receive data from a plurality of on-board management systems and to allow access to an additional bearer service via the existing Aircraft Communications Addressing and Reporting System (ACARS) messaging capabilities or Satellite Data Unit (SDU) if so chosen. The server 110 can also receive data transmitted from the ground via ACARS using the interface 145. Advantageously, the interface 145 has at least one transmit port to interface with an ACARS mobile unit (MU) 210 and at least two receive ports, one to receive management data from the Aircraft Condition Monitoring Systems (ACMS) and one to receive data from the ACARS. Additional receiving ports can be added as need to provide further management applications to monitor data from on-board sensors via the ARINC-429 bus interface 145.

Additionally, the system 100 may include a digital satellite system (DSS) interface unit (not shown) to provide broadband packet data service at faster rates than an T1/E1 rate. The broadband data service can use a Direct Broadcast Satellite (DBS) to transmit and receive packet data, including a DSS channel coding scheme, quadrature phase shift keying (QPSK) modulation and R-S forward error correction, MPEG-2 technology for compressing and transporting (data link layer) the digital video data, and low-profile antenna and DSS decoder PC board/box to receive and decode the DSS signal. Other broadband methodologies may include, but are not limited to MPEG-4 (e.g, H.263, H.261) and other compression techniques including compression techniques that are standards compliant or proprietary.

The ACU 205 enables air-to-ground communication using the existing NATS network. Advantageously, two types of ACU can be used based on the type of interface to the CDS 150, examples being a type 496 and a type 4300/8600. Type 496 has 12 ISDN BRI ports that support direct interface to BRI handsets, and type 4300/8600 interfaces to the CDS 150 by connecting to the Cabin Telecommunications Unit (CTU) 161 via ISDN PRI port 125. The data link to the ACU 205 may be via one of the B channels on the same PRI that carries voice traffic to the ACU 205 requiring the server 110 to request a B-channel call to the ACU 205 via the CTU 161.

Both types of ACU can include a baseband unit (BBU), radio frequency unit (RFU), and a power supply unit (PSU). The BBU advantageously controls the data link connection from the aircraft to the nearest ground station. Both types of ACU will accept two different data link connection types from the server. In the non-packet data mode, an asynchronous (Async) voice-grade modem dial-up via a B-channel ISDN link using a data access unit (DAU) 202 can be used. In the packet data mode, a transparent B-channel data link can be used.

In the non-packet data mode, the link operates with the BBU having an internal modem to provide V.32/V.22 capability interfacing with the modem on the server 110. In the packet data mode, the server 110 can first encapsulate the IP packet in a PPP data frame and send it to the BBU using the clear B channel data service. Once the BBU receives the PPP frame, the BBU will strip off the PPP header from the PPP packet, and repackage the remaining IP packets into the radio (RF) framing structure. The server 110 then modulates the data with phase shift keying (PSK) and up-converts the signal to radio frequency for the RFU to transmit to the ground. The RFU provides needed signal amplification for transmitted and received signals, and the PSU provides direct current (DC) power derived from the aircraft (moving object) power source.

The Human Interface Modules (HIMs) 155 can be laptop PCs, for example, used by crew and operational personnel as the gateway to the system applications via a standard graphical user interface (GUI). HIMs 155 can be housed, for example, in an adapter shell that allows connection to a common docking station, the adapter shell providing the interface between the HIM 155 and the docking station and equipped with an Ethernet interface to connect to the server 110.

System Data Link Interface Options

Figure 2:
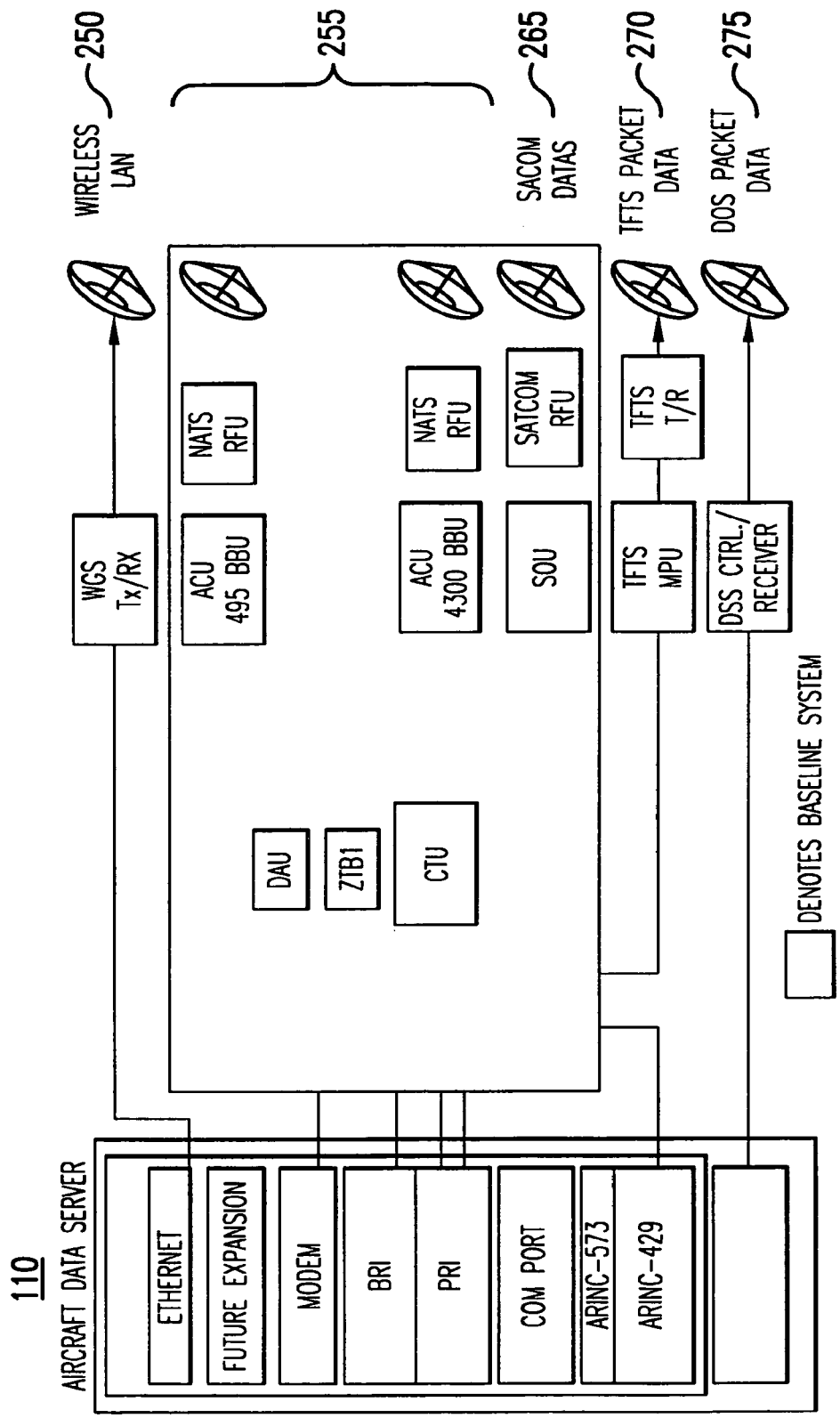
FIG. 2 is a block diagram of an alternative communication system architecture in accordance with an embodiment of the present invention.

The communication system, including server 110, has access to ground-based data servers via several data bearer services as illustrated in FIG. 2. These data bearer services can include wireless LAN services 250, NATS packet or voice-band data services 255, satellite data services 265, terrestrial flight telephone services (TFTS) 270, and direct satellite system services (DSS) 275.

Figure 3:
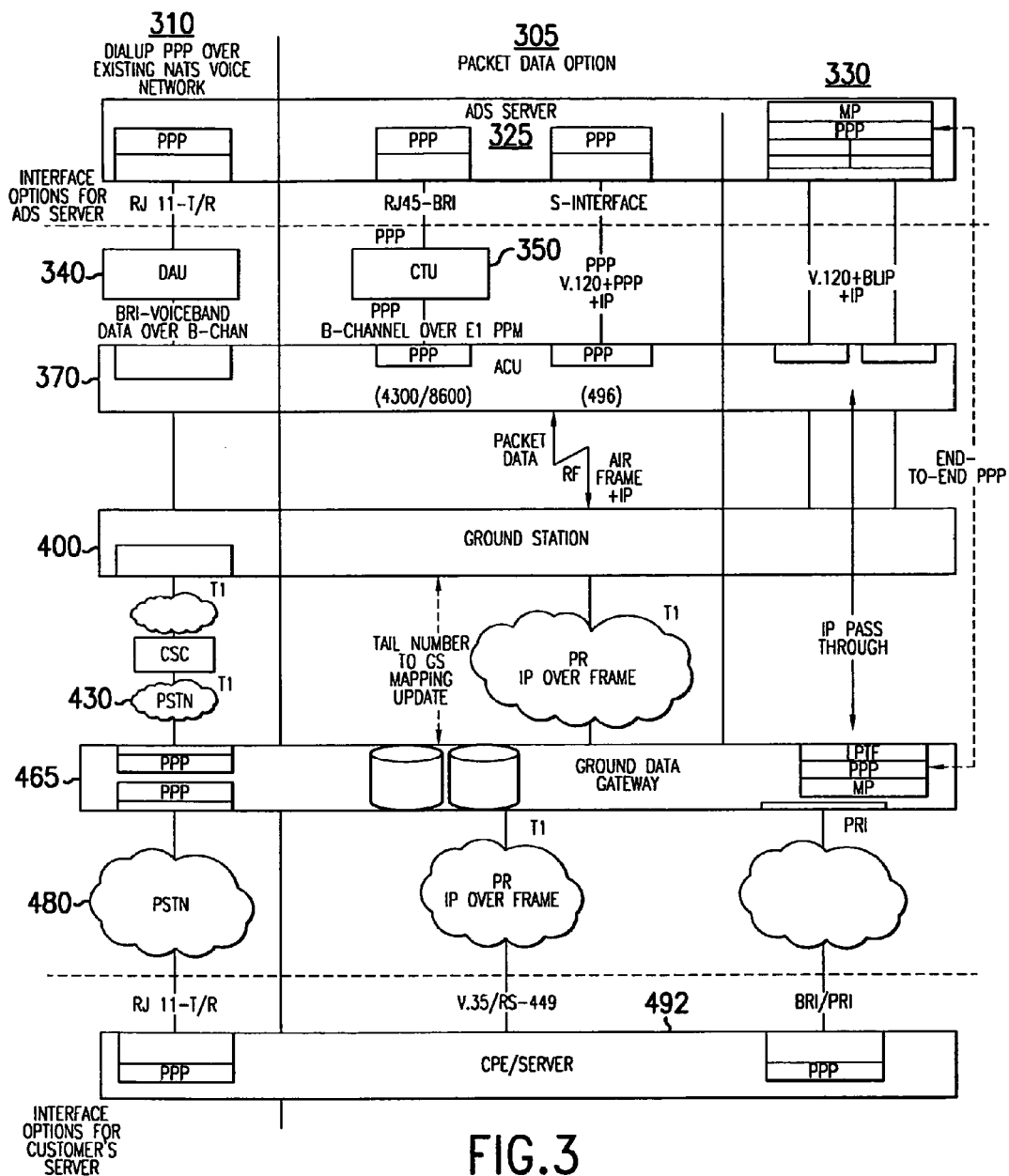
FIG. 3 is a block diagram showing the data link options in accordance with an embodiment of the present invention.

FIG. 3 illustrates the data link options for the server and for the ground-based customer premises equipment (CPE) using the NATS network. Advantageously, there are three data link options for the server 325 to connect to the ACU for providing data communication services to the ground. The first option is establishing a point-to-point protocol (PPP) connection 310 between the server 325 and the CPE 492 via a voice-grade dial-up over the existing NATS voice network. Other components of the data link may include a data access unit (DAU) 340, ACU 370, ground station 400, public switched telephone network (PSTN) 430, 480, and ground data gateway (GDG) 465. The system can use PPP as the end-to-end link layer protocol as if a direct connection exists between the server and the CPE.

The other two options operate in the packet data mode. A regular traffic channel of the NATS network will be used to carry the packetized data and a circuit switch call is performed to maintain the channel for the duration of the packet transfer. The first packet mode option 310 uses the ISDN BRI interface unit of the server 325 by connecting the server 325 to the type 496-BBU, part of ACU 370, via the BRI line. To establish a radio communication path, the server 325 can send a call setup request message to the 496-BBU, and the 496-BBU can request the ground station for a traffic channel before the 496-BBU establishes the call with the server 325. After a channel is allocated, the 496-BBU returns a call-establish-message back to the server 325, and an end-to-end ISDN data call is established between the server 325 and the 496-BBU. Subsequently, IP packets are transferred using the B channel by encapsulating them inside the PPP frame.

The second packet data option 305 uses ACU 370 of type 4300/8600. In this option, the server 325 is connected to the 4300/8600-BBU via the CTU 350 using the ISDN E1 PRI link. The call setup then follows a similar scenario as to the first packet data option that used BRI except that the CTU 350 is used to establish the call to the BBU, part of ACU 370, over one of the B-channels. At the BBU, IP data packets are channel encoded and encapsulated in radio frequency (RF) data frames. Subsequently, the data packets are modulated onto a radio frequency and sent to the Ground Station (GS) 400. At the GS 400, the data packets are sent along to the Ground Data Gateway (GDG) 465 via a Frame Relay (FR) network. The GDG 465 advantageously transfers the IP packets to different networks by proper protocol conversions, and receives all ground-to-air packet data call requests, sending them to the destination air terminal via an associated GS where a radio link is established by the air terminal.

Additionally, an alternative system architecture 330 can be used for a packet data mode allowing aggregation of multiple radio links to provide higher data throughput. This higher data rate can be achieved by tunneling the PPP frame from the server 325 to GDG 465 via a Layer Two Tunneling Protocol (L2TP). L2TP tunneling allows the PPP session to be initiated by the server 325 and terminated at the GDG 465, not the BBU (part of ACU 370), allowing the server 325 and GDG 465 to establish multiple PPP sessions over multiple radio links. The GDG 465 enables the server 325 to negotiate a PPP Multilink Protocol (MP) with GDG to bundle all the PPP sessions together to form a higher bandwidth virtual pipe.

Tunneling (L2TP) provides a number of unique advantages for the system. These advantages include using the existing infrastructure to make the addition of server data communication services transparent to the existing Air-Ground network until the IP packet arrives at the GDG. Further advantages include the following: 1) lower development costs because development is only needed at the two ends, server and GDG, and the existing serial line internet protocol (SLIP) on the BBU can be used for delivering L2TP packets; 2) allowing single point of processing for IP address assignment and packet filtering because only the GDG will be used to maintain databases; 3) allowing end-to-end recovery and flow control which therefore removes the need for the BBU to perform buffering and link layer maintenance; 4) allowing aggregation of multiple radio links to increase throughput using MP; 5) allowing future development of new PPP extensions without requiring changes to the BBU/GS because the radio network just passes the packets through the GS; 6) enabling tunneling interfaces with other bearer services, allowing all communications to occur between the server and the GDG independent of the bearer service selected.

For the CPE 492, three data link options can be selected depending on the type of data mode to be used. For a voice-grade data link, the CPE 492 can interface to the system via a V-series modem connected to a two-wire analog line from the LEC (local exchange carrier). For packet data mode, the CPE 492 has two options. For a first packet data mode option, the CPE 492 can use a frame relay service if the CPE is part of an already existing frame network. Advantageously, a permanent virtual circuit (PVC) from each GS to a NATS data gateway over the existing frame network can be established to deliver IP packets from the aircraft (moving object). The CPE can act as a router connecting to the system with the server behind it, or alternatively the server can terminate the frame relay service and IP is transmitted over the link. For the second packet data mode option which provides lower costs, ISDN BRI service is obtained from the local exchange carrier (LEC). When IP packets are destined to the CPE, the GDG will set up the data link dynamically by calling to the CPE using PPP for IP encapsulation.

Figure 4:
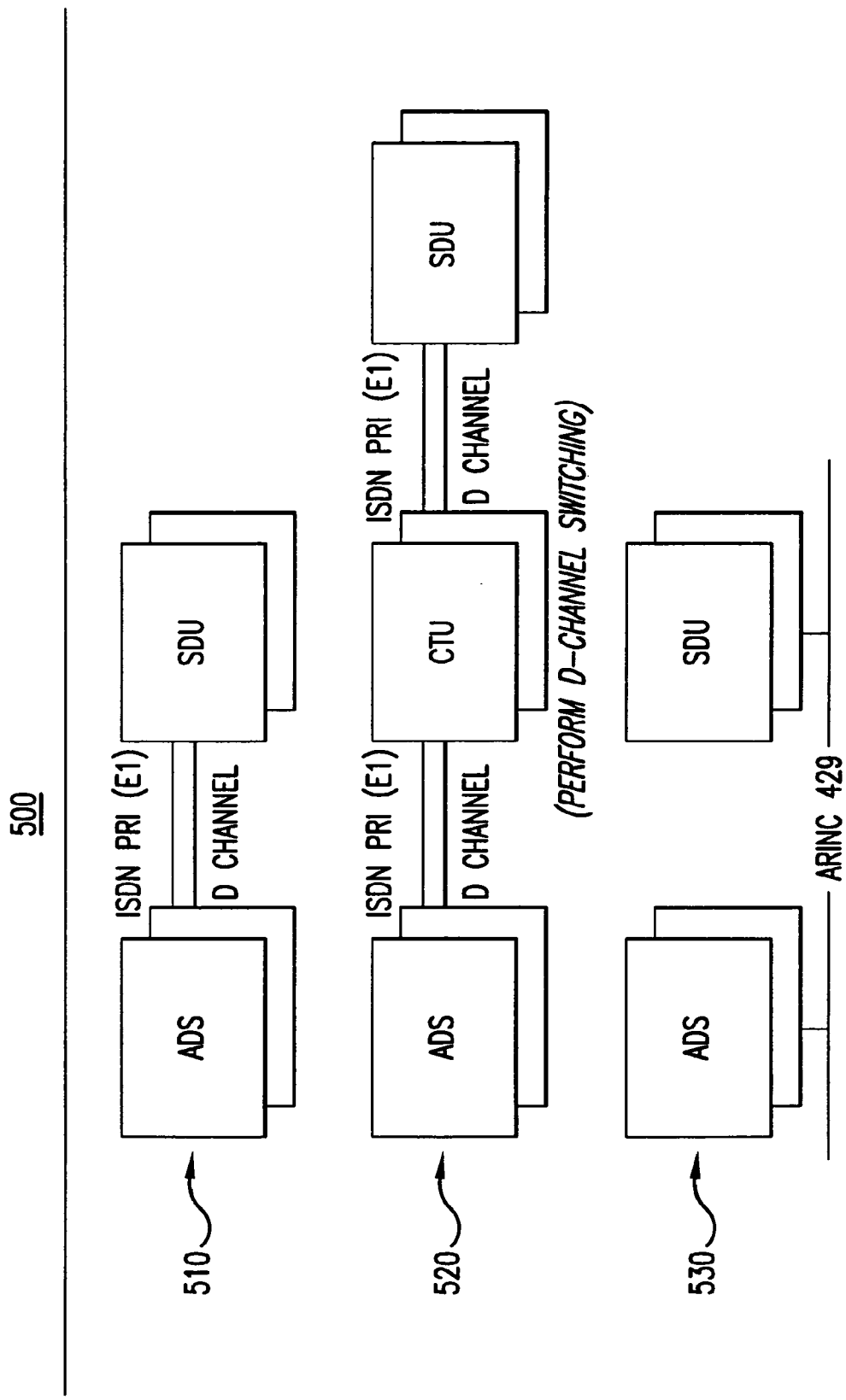
FIG. 4 is a block diagram showing the data link options via a satellite network in accordance with an embodiment of the present invention.

An alternative bearer service used by the system can be a satellite communication service. One example can be the INMARSAT DATA3 services which provides an X.25 service with maximal data throughput (e.g., 10.5 Kbps) and is accessible through the SDU 195. FIG. 4 shows the connection options 500 for connecting the server to the SDU. Two options 510, 520 may use an ISDN D-channel to establish the X.25 SVC (switched virtual circuit) and transport the X.25 data packets. An alternative option 530 can use the high-speed ARINC-429 port 145 to interface directly with the SDU for X.25 call setup and data transport.

Other alternative bearer services can be used including broadband satellite link services—for example, a DBS system. A suitable digital compression system, for example a Moving Picture Expert Group (MPEG-2) system, can be used to multiplex any digital signals with digitized video signals, including any packet data, on to one or to a very small number of satellite transponders. Other compression methodologies may include, but are not limited to MPEG-4 (e.g, H.263, H.261) and other compression techniques including compression techniques that are standards compliant or proprietary.

Use of a DSS system/interface unit allows for broadband communication independent of the particular link content, either a compressed video signal or a sequence of IP packets which can be deciphered by a video coding device at the GS and the DSS receiver on the aircraft. Passenger and cabin applications for this broadband satellite service include, but are not limited to, software downloading, flight information updates, Internet browsing, and TV/video delivery.

Figure 5:
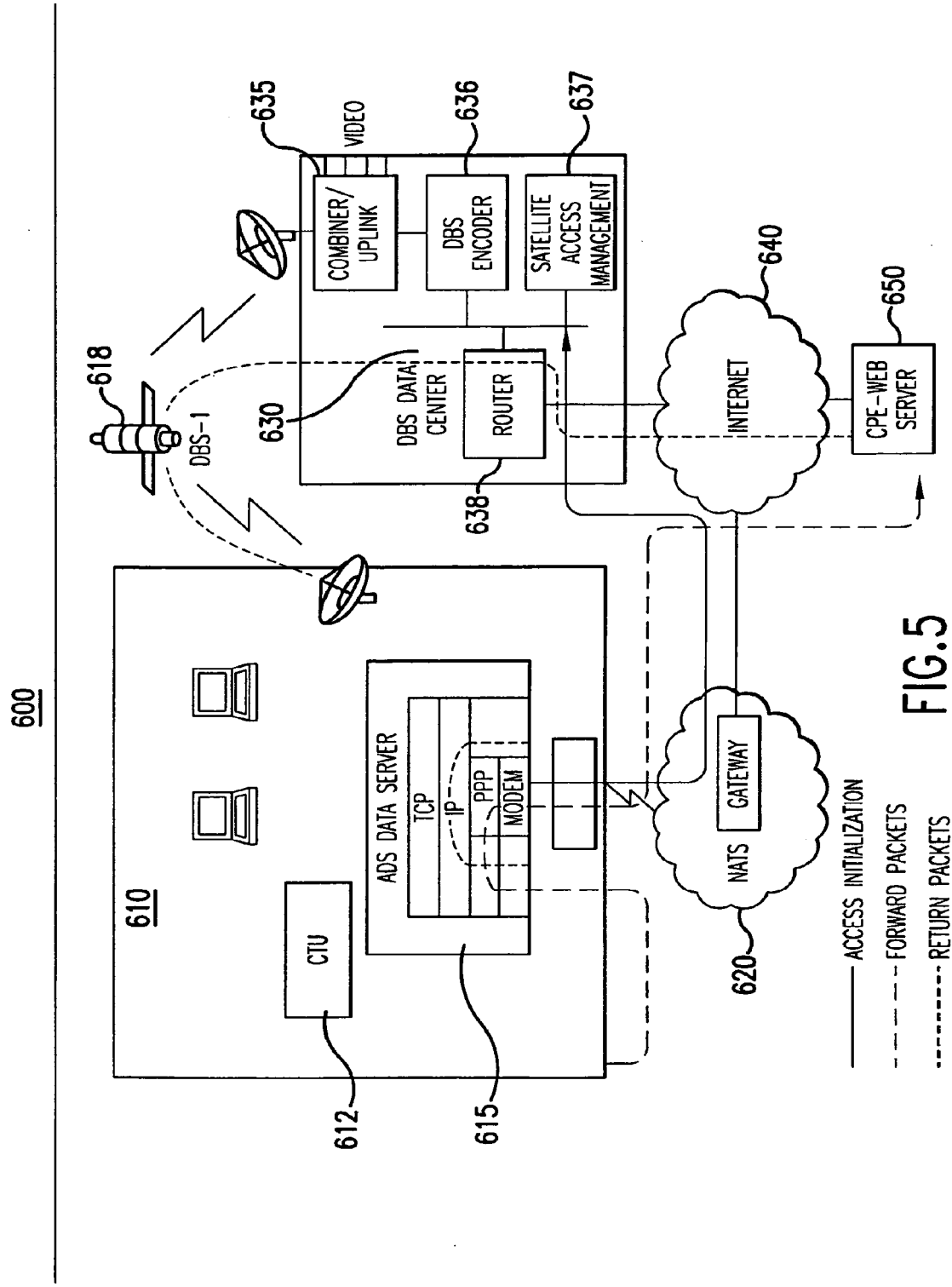
FIG. 5 is a block diagram of a communication system architecture using a satellite network in accordance with an embodiment of the present invention.

FIG. 5 shows the architecture 600 of a satellite data communication service using DSS technology. The system architecture includes aircraft system 610 having server 615 and CTU 612 for facilitating a communications link to a DBS data center 630, via a DBS Satellite 618, and NATS network 620 interconnected to internet facilities 640 and CPE 650. DBS data center 630 includes router 638, satellite access management system 637, DSS encoder 636, and radio equipment including combiner/uplink 635. The system architecture 600 further includes on the aircraft a DSS receiver/decoder and antenna (not shown) to help facilitate the broadband service.

The system architecture 600, using asymmetrical data transport, can provide large bandwidth (e.g., in excess of 5 Mbps) from the network (DSS, upstream) to the aircraft and from the aircraft to the network (e.g., 4.8-9.6 Kbps) (NATS, downstream). A large bandwidth for the upstream can be useful for web applications since most Internet browsing retrieves a much greater amount of information than is initially transmitted.

Alternatively, other satellite bearer services can be used to deliver data communication services, for example, LEO/MEO/GEO (low earth orbiting/middle earth orbiting/geosynchronous earth orbiting) satellite systems. Specific commercial examples of suitable LEO/MEO/GEO systems include, but are not limited to Iridium, Globalstar, ICO, Odyssey, Millennium, Space, Astrolink, Cyberstar, and Teledesic. Use of these systems enables data service offerings in the exemplary range of 384 Kbps-1.2 Gbps, and allows various data applications including video conferencing, high-quality video, high-speed Internet, and virtual LAN service.

Figure 6:
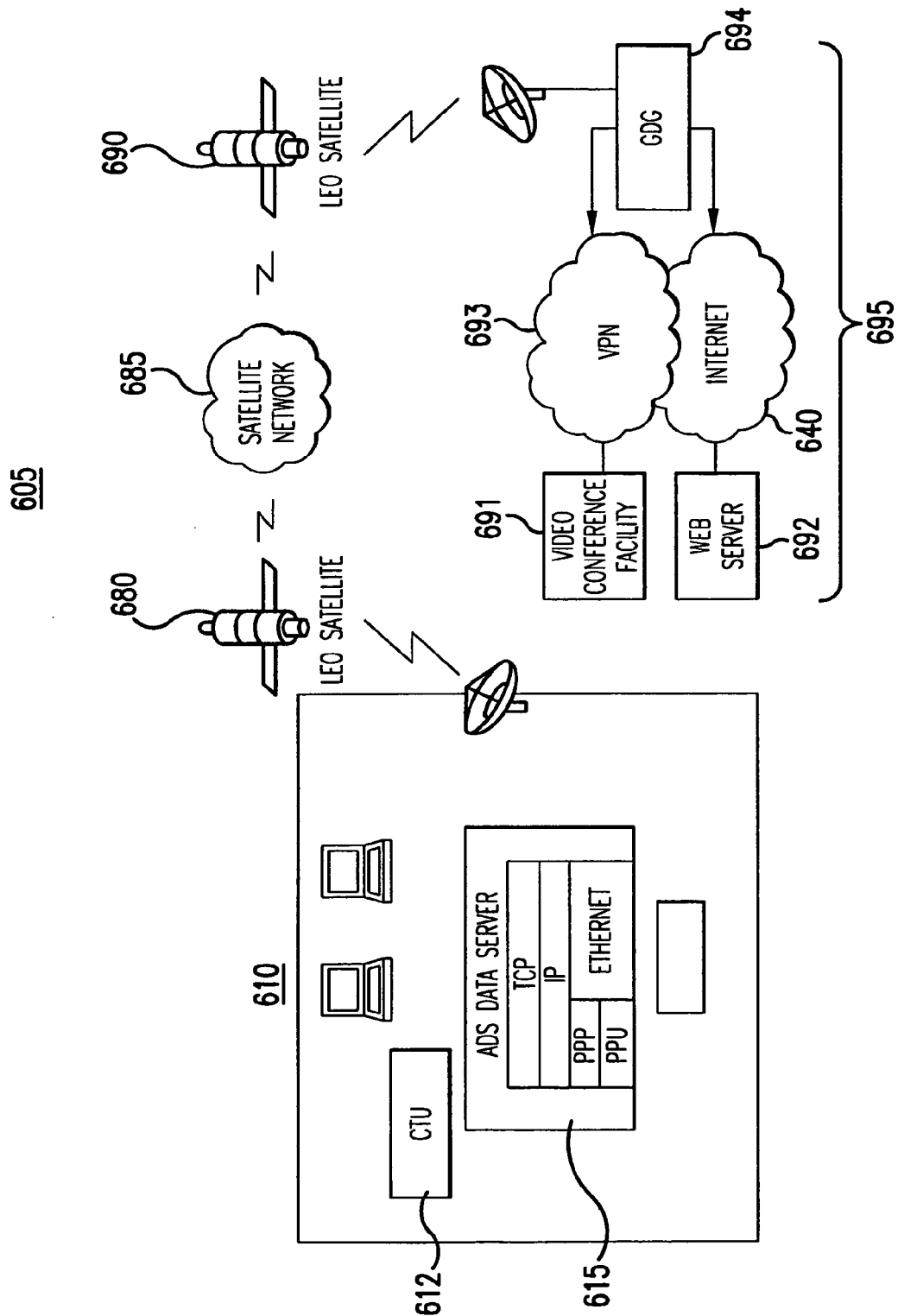
FIG. 6 is a block diagram of an alternative communication system architecture using a satellite network in accordance with an embodiment of the present invention.

FIG. 6 shows a representative example of a data communication system architecture 605 using a LEO/MEO/GEO satellite network. The system architecture 605 includes aircraft 610 having CTU 612 and server 615, with a data communication link to satellite network 685 and ground networks 695 via satellites 680, 690. The ground networks 695 can advantageously include GDG 694, video conference facility 691, VPN (virtual private network) 693, Internet facilities 640, and web server 692. The aircraft 610 acts as one of the ground-based clients receiving and transmitting high speed data via the satellites 680, 690. The system 605 is a two-way system which alleviates the need to use the NATS network for a return path, and allows the server 615 to treat the satellite link as just another two-way bearer service by using the satellite broadband network 685 to interconnect the aircraft 610 and the ground networks 695, via a mobile terminal (MT) (not shown) connecting to the ground networks 695.

The satellite network 685 can perform necessary routing and handoff procedures to establish and maintain connectivity between the aircraft 610 and ground networks 695. Additionally, the satellite network 685 can serve as a network cloud providing connectivity between any pair of clients (e.g., aircraft 610 and ground networks 7695) preferably using SVCs or PVCs.

The aircraft 610 includes a satellite transceiver unit capable of transmitting and receiving data using any particular satellite network, and having the capability of handling either ATM or frame relay protocol such that a SVC or PVC can be established between the aircraft transceiver box and ground networks 695. Using this setup, IP packets can be encapsulated by these lower layer protocols to enable a transparent conduit for IP packets to travel from the aircraft to the desired ground networks 695.

Figure 7:
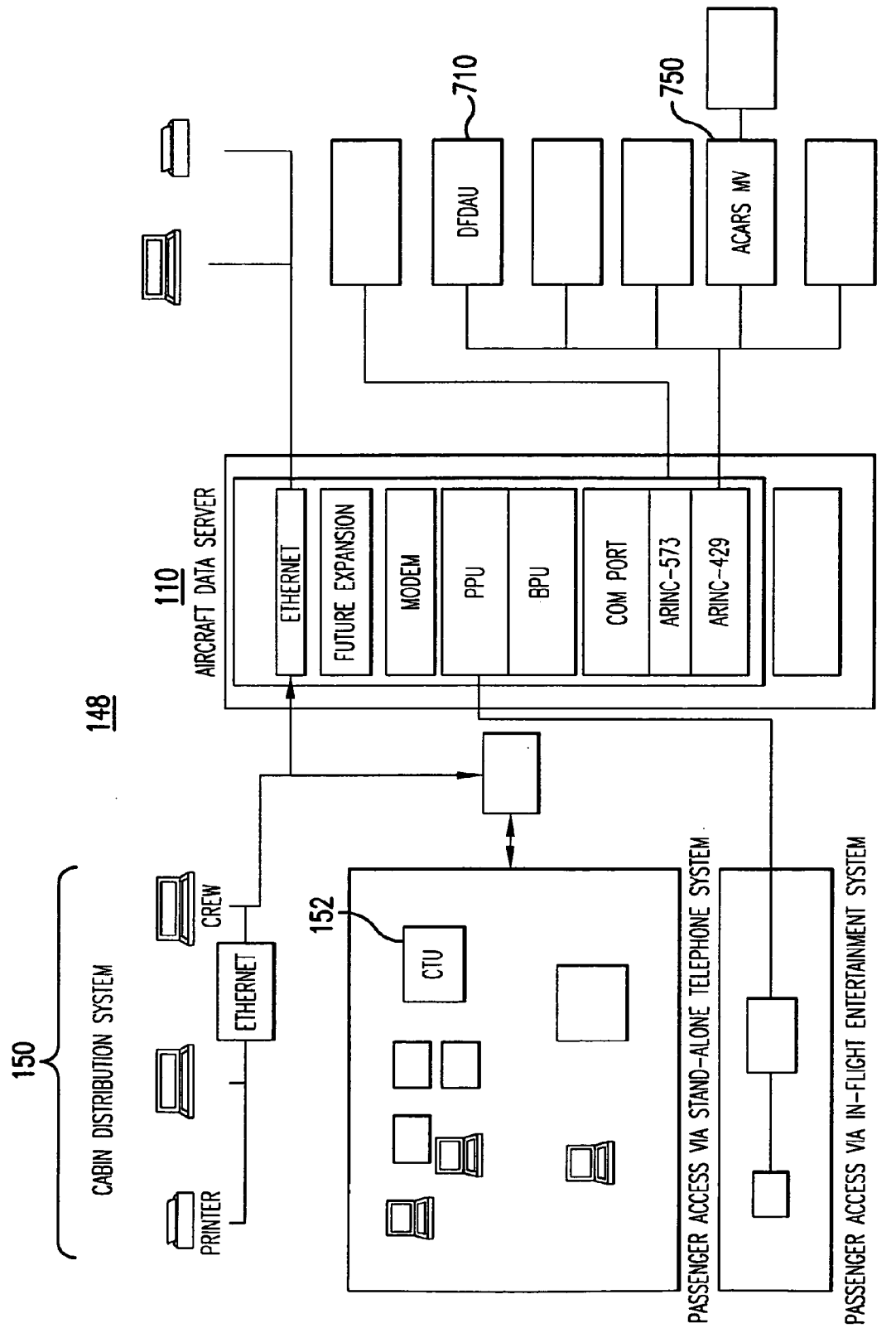
FIG. 7 is a block diagram of another alternative communication system architecture in accordance with an embodiment of the present invention.

Another alternative data link option enables passenger cabin dial-up access services. FIG. 7 shows the communication system architecture 148 for passenger cabin dial-up services. The system architecture 148 includes cabin distribution system 150, server 110 having its components, and can further include digital flight data acquisition unit (DFDAU) 710, ACARS MU 750, and other components.

The system 148 allows a user (passenger) to access internet service, either via an on-board internet service or using the server as a proxy to access the rest of the Internet. At least two types of access are available depending on the configuration of the user's access device (e.g., laptop). For all access scenarios, the connection to the server 110 via the TS function will be over a CTU-switched ISDN B-Channel. Advantageously, the user's access device can be equipped with a PCMCIA V-series modem allowing connection to an RJ-11 jack on the handset, and the handset can be connected to the CTU 152 via the CDS network. For this configuration, a modem pool, as part of the TS function, can peer with the laptop modem, and the link layer protocol is PPP so that proper authentication (for billing purposes) and dynamic IP address assignment can be achieved. Advantageously, a useful COTS TS for serving this function includes, but is not limited to, the Ascend MAX or US Robotics Total Control that, on one end, can interface with the CTU via a T1/E1 PRI or with the BBU via a BRI and, on the other end, with the server via Ethernet (see FIG. 1)

Alternatively, the user's access device can be equipped with an ISDN modem, alleviating the need for the server 110 to have modem capability. In this configuration, an internal COTS PRI PC card can be used for handling the end-to-end digital signal. Advantageously, this particular configuration imposes no additional development on the aircraft end, only requiring modification on the handset to provide a U-interface for connecting to the user access device ISDN modem.

Networking

Figure 8:
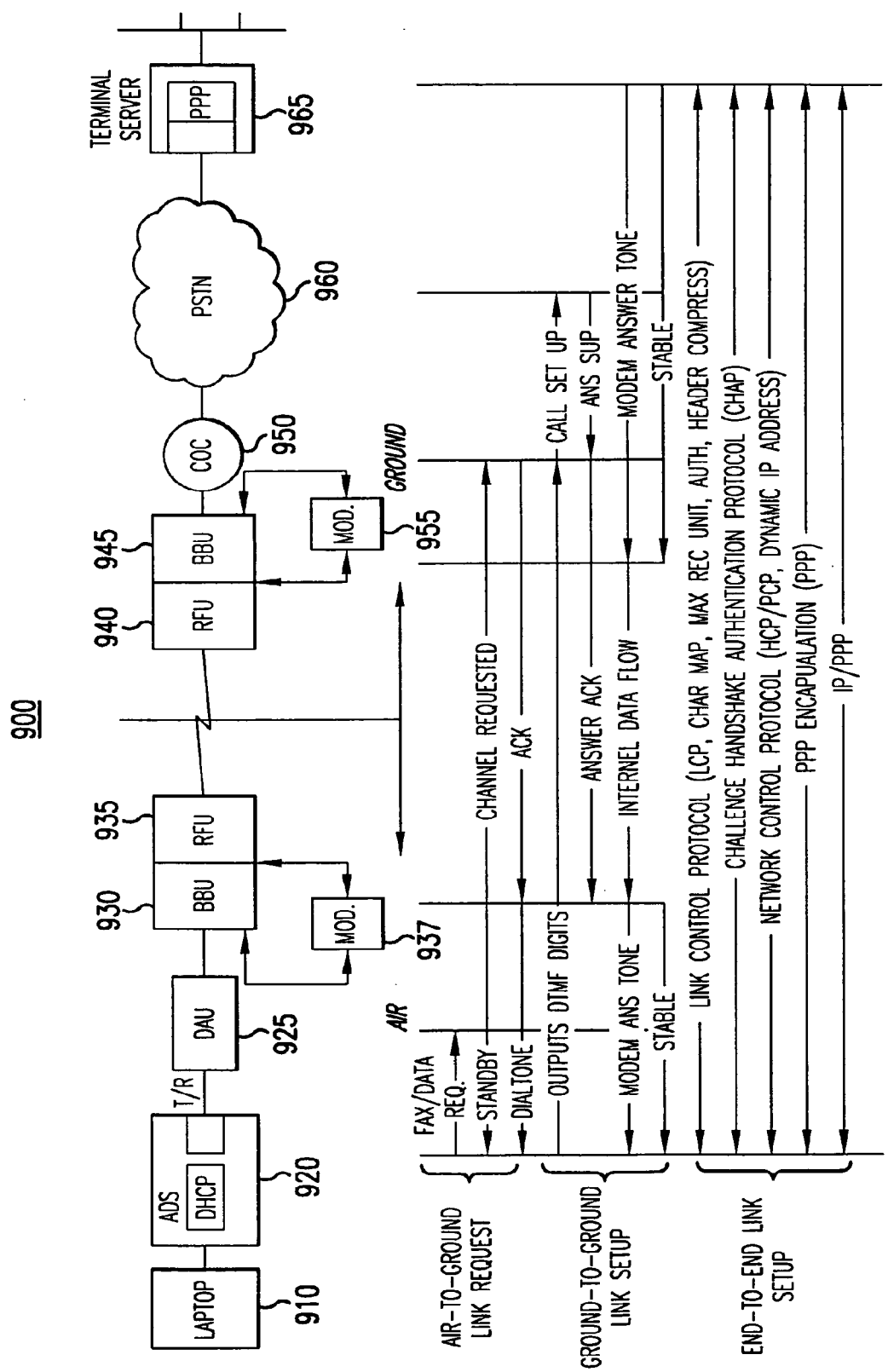
FIG. 8 is a block diagram of another alternative communication system architecture in accordance with an embodiment of the present invention.

FIG. 8 shows a more detailed illustration of the server data link option to the ground using the existing voice-grade NATS network. This system architecture 900 includes access device (e.g., laptop) 910, server 920, DAU 925, BBU 930, modem 937, and RFU 935 as part of the air portion of the architecture 900, and RFU 940, BBU 945, modem 955, switching center 950, PSTN 960, and terminal server (TS) 965 as part of the ground portion of the architecture 900.

As described previously, a point-to-point link can be established between the aircraft and remote server using the PPP link layer protocol to encapsulate IP for transfer across this virtual connection. The data link can be established in three stages, using an air-to-ground link request, ground-to-ground call setup, and end-to-end call setup.

Advantageously, the air-to-ground link can be first requested using a FAX/DATA channel request signal via the DAU 925 to the BBU 930. BBU 930 can determine which ground station to use and can then send a request channel signal, via RFU 935, to the ground station (GS) selected. Once the selected GS finds an available channel, the GS sends a request to the switching center (SC) 950, receives an acknowledgment, and then returns the acknowledgment with the assigned channel to BBU 930, via BBU 945 and RFU 940. After receiving the acknowledgment signal, BBU 930 sends a signal to server 920 via DAU 925 indicating that a channel is being made available. Upon completion of this air-to-ground link request (channel availability), the voice path can be established between the server 920 and the SC 950, and the SC 950 inserts an in-band dial-tone and waits for the server 920 to out-pulse in-band DTMF digits to complete the ground portion of the call connection.

Once the air-to-ground call setup is completed, the ground-to-ground call setup can then proceed. Once the server 920 receives the "dial-now" signal, it then out-pulses the 10-digit phone number to the SC. The SC then connects to the destination number via the PSTN and bridges the two conference legs together. At this point, the SC returns the call progress tone all the way back to the server 920. Upon answering the call, the remote TS 965, either at the GDG or the CPE, sends the in-band modem answer tone, via modem 955, to start the modem negotiation with the calling party, via modem 937. Once the GS detects the modem tone, it cuts the voice path, and sends a signal to the BBU 945 to request it to start modem training with the server 920. At the same time, the GS starts the modem training with the TS 965. When both pairs of modems 937, 955 complete the training, the data can flow through the air link using a particular out-of-band protocol while the data flowing between the two pairs of modems can use a V-series protocol.

Once the setup of the physical layer between the server 920 and TS 965 is completed, the TS 965 can start the link layer negotiation with the server using the PPP protocol in accordance with RFC 1548, 1549 including the three main components of PPP: LCP (Link Control Protocol), NCP (Network Control Protocol), and multi-protocol encapsulation. PPP encapsulation frames can be used to carry the IP traffic across the data link between the two PPP peers, the server 920 and the TS 965 of the ground network. Advantageously, the server 920 may act as a proxy server or perform network address translation for any clients on the same LAN.

Figure 9:
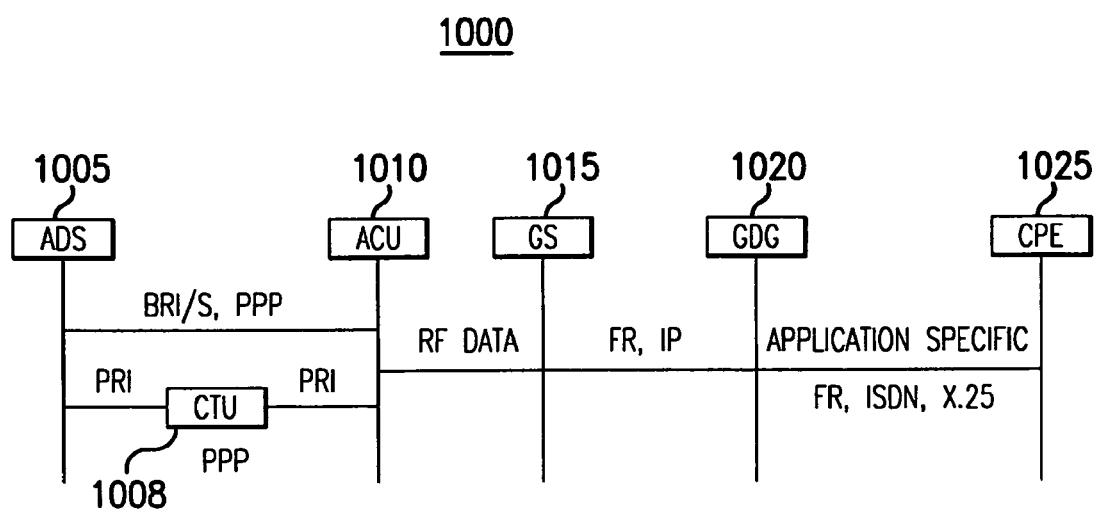
FIG. 9 is a block diagram of another alternative communication system architecture in accordance with an embodiment of the present invention.

FIG. 9 shows a more detailed illustration for the packet data connections using the NATS network. The link architecture 1000 includes server 1005, CTU 1008, ACU 1010, GS 1015, GDG 1020, and CPE 1025. Different data link protocols can be followed over different link segments. Advantageously, a call scenario can start when the server 1005 needs to establish a data link to the ground IP network. When the BRI is used, the server will send out a call setup request via the D channel to the BBU with data call indication. The BBU will then request a traffic channel from the GS 1015 for data use. Once the GS allocates a channel and acknowledges the BBU, the BBU will send back the call connected Q931 message back to the server 1005 and allocate the B channel for such use. All subsequent IP data will go over this clear B channel using PPP to frame the IP packets.

Alternatively, if the ISDN PRI is used instead for call setup, the call request can be initiated when the server sends a call setup message to the CTU 1008 as described previously. CTU 1008, based on the destination number of the call setup message, will send an incoming data call indication to the BBU. Once the BBU detects the incoming call event, it will proceed and negotiate a traffic channel as described previously. Once the channel is allocated, the BBU will send back call answer messages to the CTU to inform the server 1005 that a data link is up and it is ready to receive any PPP packets. Once the PPP packet arrives at the BBU, the BBU will strip off the PPP header from the PPP packet, put the remaining PPP packets into RF frames, and transmit the channel-encoded RF frames over the radio link to the GS 1015.

Once the GS 1015 receives the radio frame, it will recover the IP packet and forward it to the GDG 1020, advantageously serving as a router and interface to the public Internet and to the private network that interconnects the CPE servers such that every IP packet will be routed to the appropriate network based on the destination IP address. For ground-to-air packet data calls, the GDG will send call request messages to the associated GS for certain destination air terminals via a frame relay network. When a radio link is available, a connection will be set up from GDG to server (using circuit mode from GS to server).

Circuit Mode Data in the Packet Data Network

Figure 10:
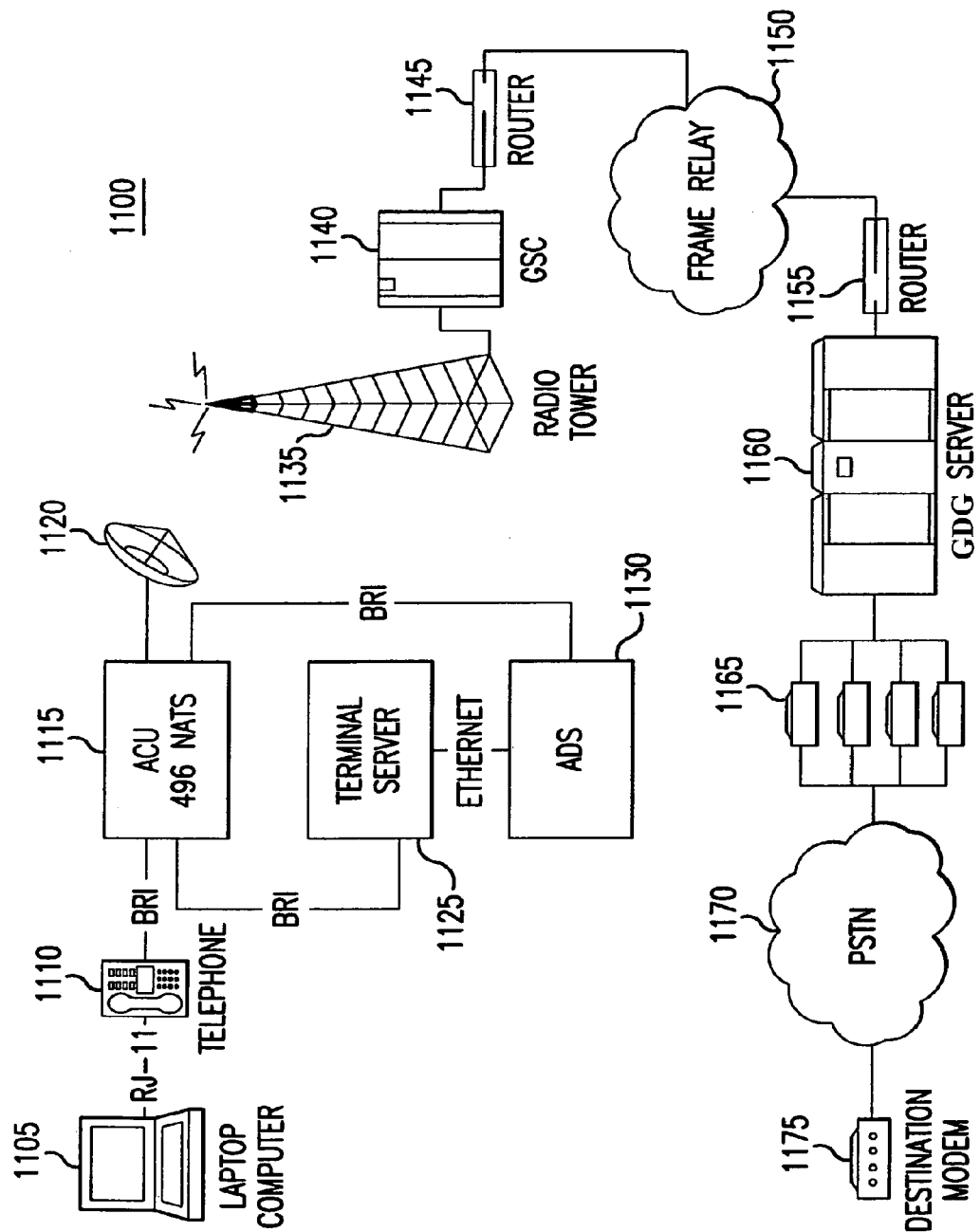
FIG. 10 is a block diagram of another alternative communication system architecture in accordance with an embodiment of the present invention.

The packet data architecture described herein can be used for an improved circuit mode data solution (non-CTU installation). The circuit mode data system architecture 1100 is shown in FIG. 10. The system architecture 1100 includes user access device (e.g., laptop) 1105, telephone 1110, ACU 1115, TS 1125, antenna 1120, radio tower 1135, server 1130, ground station controller (GSC) 1140, router 1145, frame relay 1150, router 1155, GDG 1160, modem pool 1156, PSTN 1170, and destination modem 1175.

Figure 11:
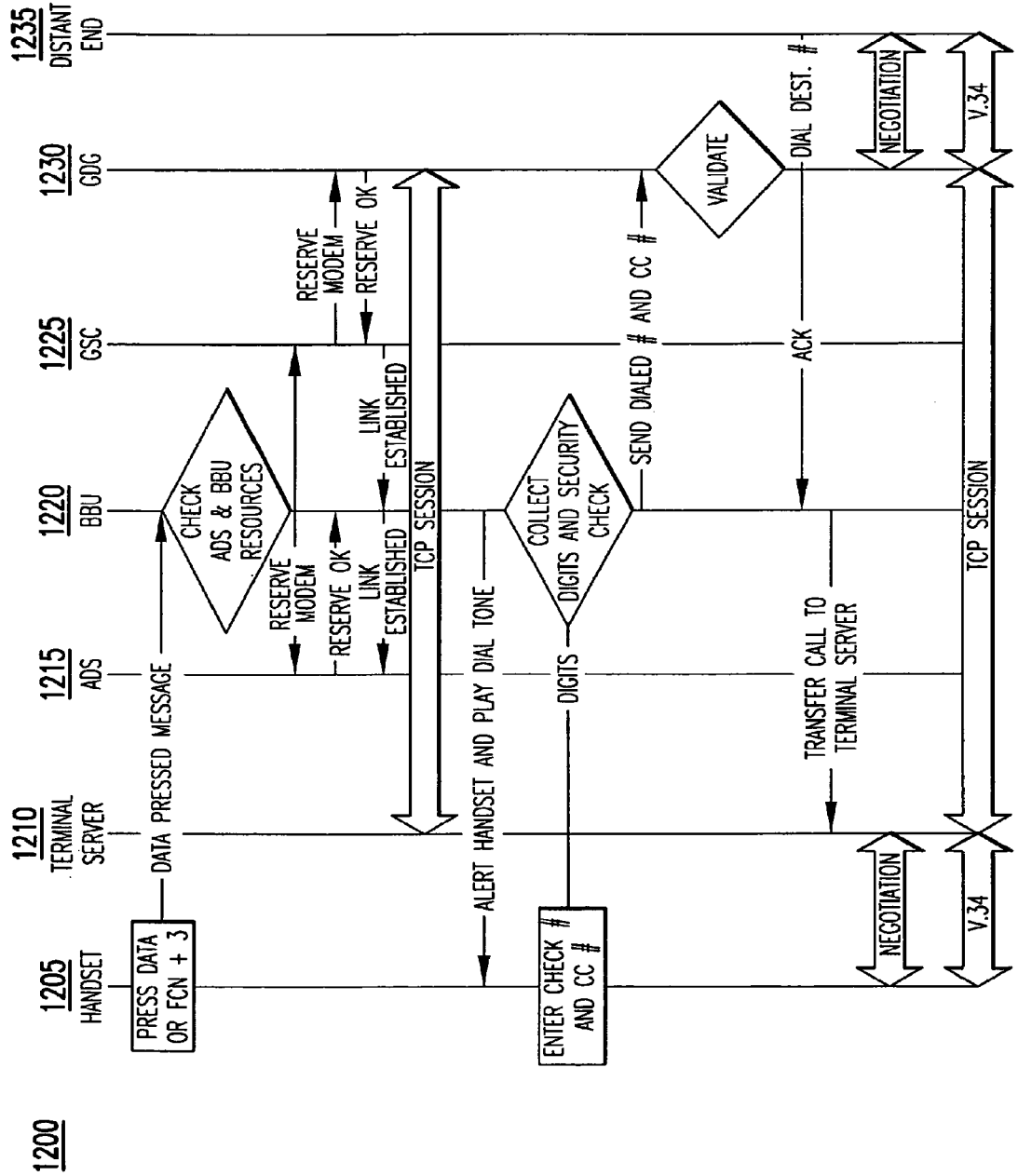
FIG. 11 is a call flow process diagram of a communication system architecture in accordance with an embodiment of the present invention.

FIG. 11 illustrates the call flow procedures 1200 for the circuit mode data solution for the packet data network. In accordance with embodiments of the present invention, the circuit mode data solution can use a TCP/IP interface to be constructed between the server and the GDG. The call flow 1200 includes a plurality of components including user access device (e.g., handset) 1205, TS 1210, server 1215, BBU 1220, GSC 1225, GDG 1230, and remote end device 1235.

Upon user request from the user access device 1205, the BBU 1220 can check to verify that adequate radio and server resources are available. Assuming adequate resources are available, the BBU 1220 will then proceed to reserve a modem on the TS 1210 and establish a link to the GSC 1225. Once the link to the ground is established, an end-to-end TCP circuit is setup between the appropriate GDG 1230 and TS 1210 components, advantageously performed using telnet or a socket connection between the two components. The BBU 1220 also forwards dialing and dialed numbers to the GDG 1230. Pending a sanity check on the dialed number and a validation check on the billing instrument, the GDG 1230 will initiate a connection to the desired destination party via a modem. Simultaneously, the BBU 1220 will transfer the call to the TS 1210 voice-band-data BRI interface with both modem connections (i.e., passenger to TS 1210 and GDG 1230 to remote end device) negotiating the link separately. Upon confirmation that these two links have been established, the GDG 1230 and TS 1210 can shuttle information to each other. Additionally, this configuration can support handoffs of voice-band-data calls.

Server Software Architecture

Figure 12:
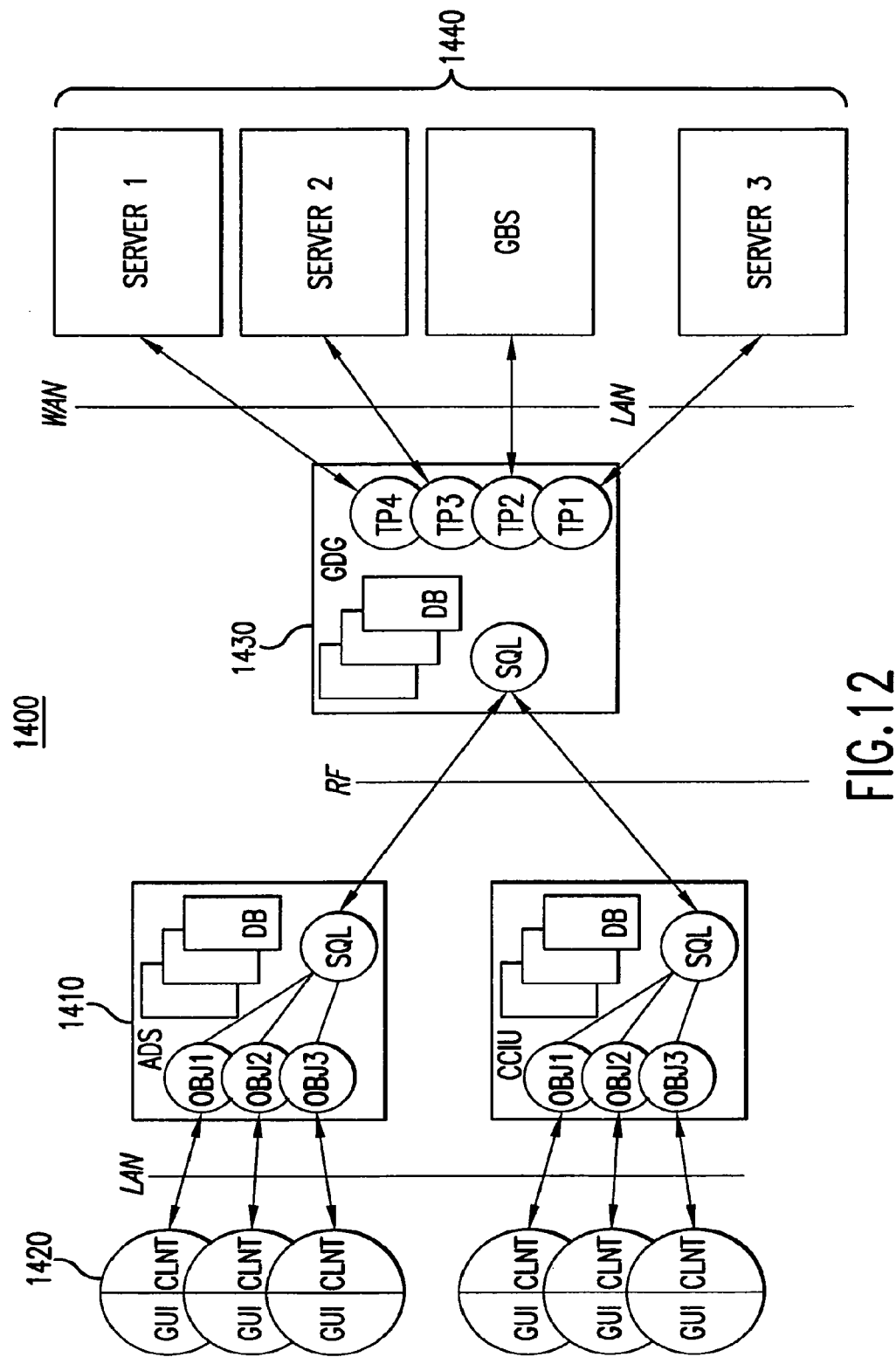
FIG. 12 is a block diagram of the software infrastructure for the data communication server in accordance with an embodiment of the present invention.

As illustrated in FIG. 12, the server of the data communication system can advantageously include an object-oriented software architecture 1400. Software architecture 1400 includes server 1410, GDG 1430, and ground-based servers 1440. An object-oriented software architecture is exemplary and alternative software architectures may be used including, but not limited to, C++, JAVA, HTML, etc.

Use of an object-oriented design includes that each system resource or service provider bears an object entity, and that services are accessible via the published methods. Resources are managed within the objects. Additionally, the server 1410 may advantageously use a client-server model wherein the clients request the service by accessing the published methods or interfaces on the servers 1440. The software architecture also advantageously may use location transparency wherein the objects are accessible by the clients universally within the confines of the access control and the network connectivity.

As shown in FIG. 12, the software architecture 1400 may optionally include GUI (Graphical User Interface) 1420 having interfaces allowing data communication applications to request services from the server 1410. Preferably, objects on server 1410 can advertise services that applications are allowed to access, the applications also accessing a Structured Query Language (SQL) manager as needed to interact with the GDG 1430 to retrieve or send data. The GDG 1430 may serve as a Data Proxy, using local storage space to either cache the data for upload to the server 1410 or download to the customers' (user) ground-based servers (GBS) 1440. GDG 1430 will then use the proper transport to interact with the GBS 1440 for data transfer. The GUI 1420 can be optional to the design as applications may run unattended without human intervention and therefore are only used for maintenance operations under those conditions. The design of the architecture 1400 is independent of the underlying operating system.

Figure 13:
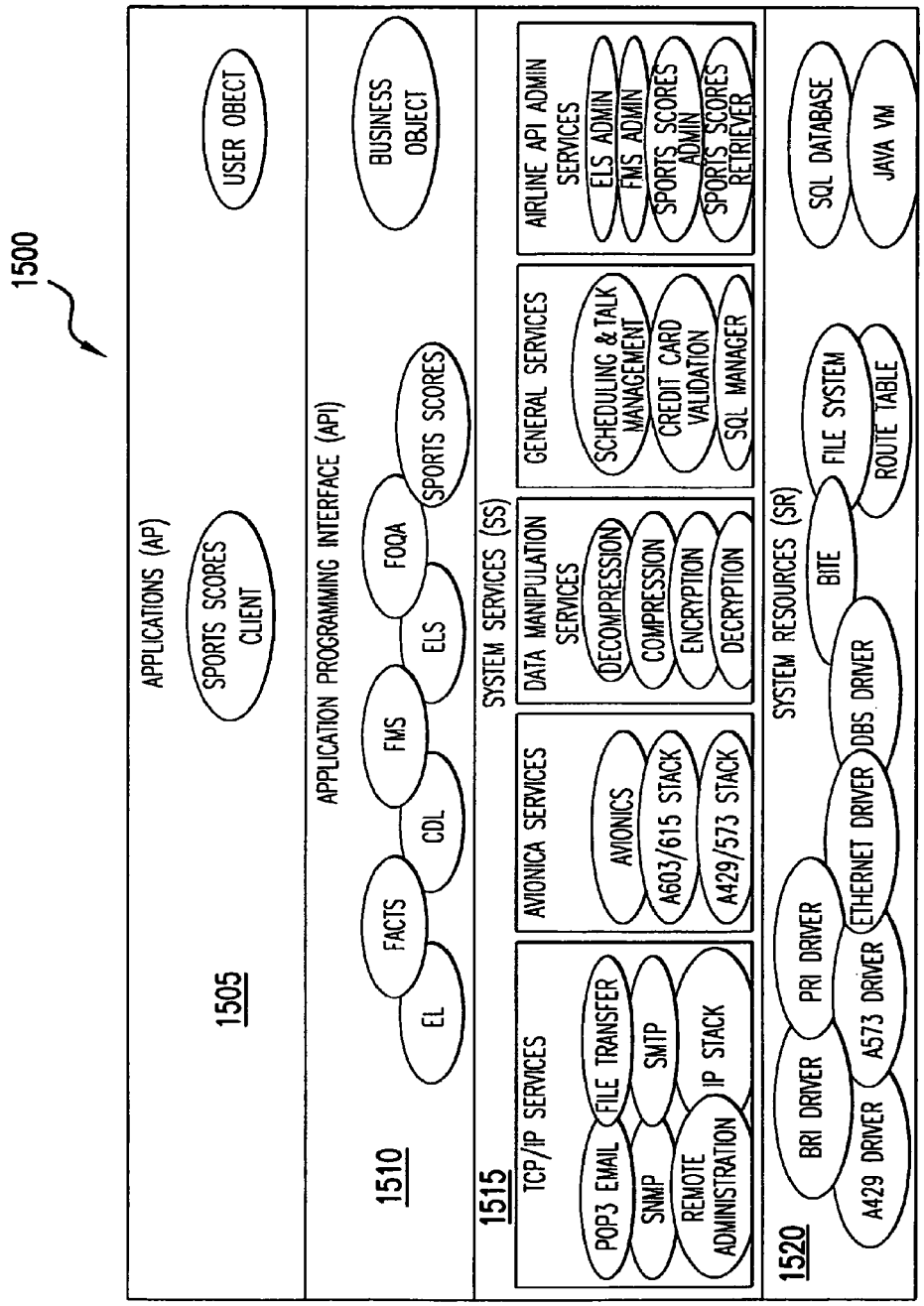
FIG. 13 is a software function layer diagram of a communication software infrastructure for the data communication server in accordance with an embodiment of the present invention.

The software architecture can be logically divided into four functional layers 1500 as shown in FIG. 13. These layers include an applications (AP) layer 1505, application programming interface (API) layer 1510, system services (SS) layer 1515, and system resources (SR) layer 1520. The AP layer can contain applications that are developed by the aircraft or other parties. The SR layer contains the system resources that are used by the SS layer when providing service to higher layer components. The SR components can include the server bearer resources, the databases, the data storage, and JAVA execution environment, etc.

The SS layer components provide system-level services to the objects in the API layer or to other components in the same layer. The services can include, but are not limited to, various TCP/IP services, avionics standards services, data compression and cryptographic services, scheduling, and transaction-oriented services. The SS layer includes API administration SS to manage all API objects, its purpose being to provide access control, service activation/deactivation, and property change capabilities of the API object to the data communication service provider.

Advantageously, the SR layer may include at least four types of components used by the data communication server. These components can include device drivers, BITE system, file system, and miscellaneous facilities. Dependent on the underlying OS of the data communication server, the components of the SR layer may be part of the embedded OS or may be specially designed for aircraft data communication services.

Device drive (DD) components enable the SS layer components to interact with communication devices for data exchange with the GDG or with onboard avionics devices. Advantageously, the DD may be part of the underlying OS or may be specially developed, and includes a plurality of components including a BRI driver, PRI driver, Ethernet driver, ARINC-429 driver, and ARINC-573 driver.

The SR file system can advantageously provide a consistent way to store (or provide permanent storage—persistence) the data, including allowing the SS components to perform read, write, and delete operations based on particularly developed user rights or permissions. Additionally, the file system can include a special system file, the route table, used for determining the routing for IP packets. The route table can include a set of known routes and be locally stored in non-volatile memory.

Miscellaneous facilities can include an SQL database and a JAVA Virtual Machine (VM). The SQL database provides a database engine to store and manage the data needed by the server SS and API components, including all necessary database transactions such as query, insert, update, and delete functions. Advantageously, the JAVA VM can allow the server to access other network-based services using JAVA applications or applets. Use of the VM allows the server to write an API using JAVA architecture that allows clients from other platforms running a different OS to request services from the data communication server with a standardized protocol.

The API layer provides a consistent way for the AP to acquire and utilize data-oriented aircraft services. Advantageously, a generic object is produced, an example being the generic business object (BO), that will allow access to these services assuming specific transport protocols (e.g., TCP/IP, UDP, etc.). This allows use of an object without specific knowledge of the service support structure. Alternatively, each component in the API layer can be represented as an object that provides one specific aircraft service, each object containing three major parts—the communicator, the receptor, and the service logic. Services provided by each API object can be characterized by properties, methods, and events and are exposed through the communicator and the receptor.

Figure 14:
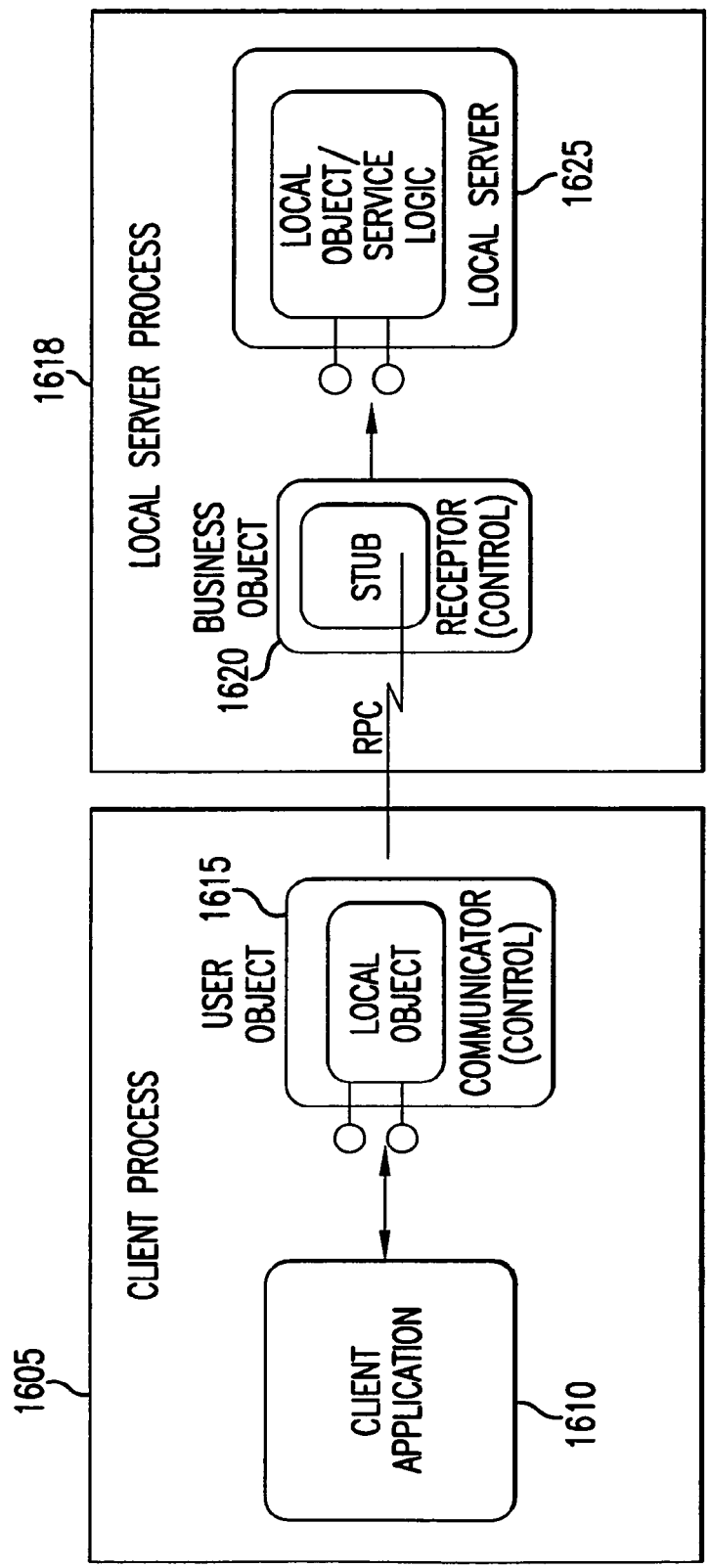
FIG. 14 is a block diagram for the service logic architecture of a communication software infrastructure for the data communication server in accordance with an embodiment of the present invention.

The communicator is a client-side component which can be represented as a control in a user object (UO), or the object embedded in AP, which enables the AP to invoke services and to communicate or share the data construct with the object via a known set of properties, methods, and events. The receptor component which can be represented as a control in the business object and which resides inside the object itself, is used to accept the service requests and to share and communicate back with the AP. The service logic is the implementation of the object itself and has access to the lower-layer components. This architecture is illustrated in FIG. 14 and comprises the client process 1605 and the local server process 1618. Client process 1605 includes client application 1610 and user object 1615, and local server process 1618 includes business object 1620 and local server 1625.

Other API objects can include Objects to retrieve updatable or time-sensitive information for a user, information that may lose its value if not retrieved by the user in a pre-determined period of time, and information that may be updated as a result of this value loss. This updatable or time-sensitive information for the user may include news information, sports scores, weather information, traffic information, politics information, business information, finance information, and other updatable or time-sensitive information. Other objects may include FMS (Flight Management System) Object for database loading, the FOQA (Flight Operations Quality Assurance) object for obtaining and managing ACMS data, and other objects.

In practical operation, the communicator can provide the clients the necessary networking and protocol handling capability to execute services on the server, and the receptor handles the requests initiated by the clients and starts "Instances" of the services being requested. Following this process, the communicator of the API allows the applications to make use of the services provided by the server. Similarly, the communicator of the SS object allows other SS and API components to utilize the services provided by the SS object.

Figure 15:
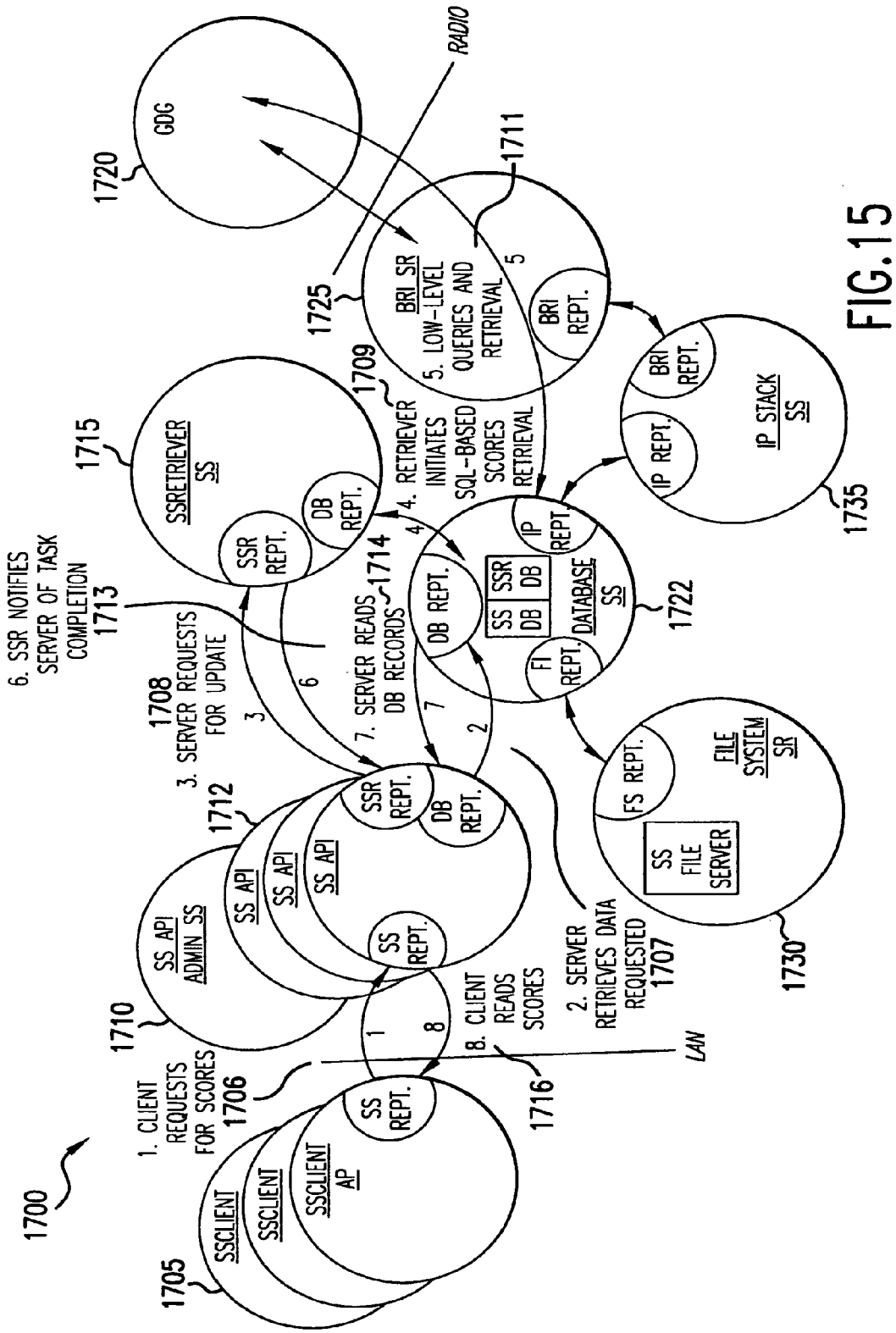
FIG. 15 is an application software function layer diagram of a communication software infrastructure for the data communication server in accordance with an embodiment of the present invention.

FIG. 15 shows a representative example of the functional layer process 1700 for an exemplary application, a sports score application. A similar process can be followed for other applications to retrieve updatable information. The functional layer process 1700 includes a plurality of components including client 1705, admin server 1710, file system SR 1730, retriever SS 1715, BRI SR 1725, Database SS 1722, IP stack SS 1735, and GDG 1720.

For this example, a sports score retrieval SS 1715 is advantageously registered with the scheduler enabling execution periodically to retrieve sports scores from the GDG 1720. A sports scores admin server 1710 instantiates sports scores API objects 1712 and makes them available for the sports score clients 1705 to obtain sports scores for the user. A Database SS 1722 is used by sports scores API 1712 and retriever 1715 to store (persist) and share the scores files, advantageously stored in a user profile. It is also used by the retriever 1715 to initiate an SQL query, via the IP Stack SS 1735 and BRI SR 1725 (or alternatively, an Ethernet SR), to the GDG 1720 to retrieve the latest cached scores.

Figure 16:
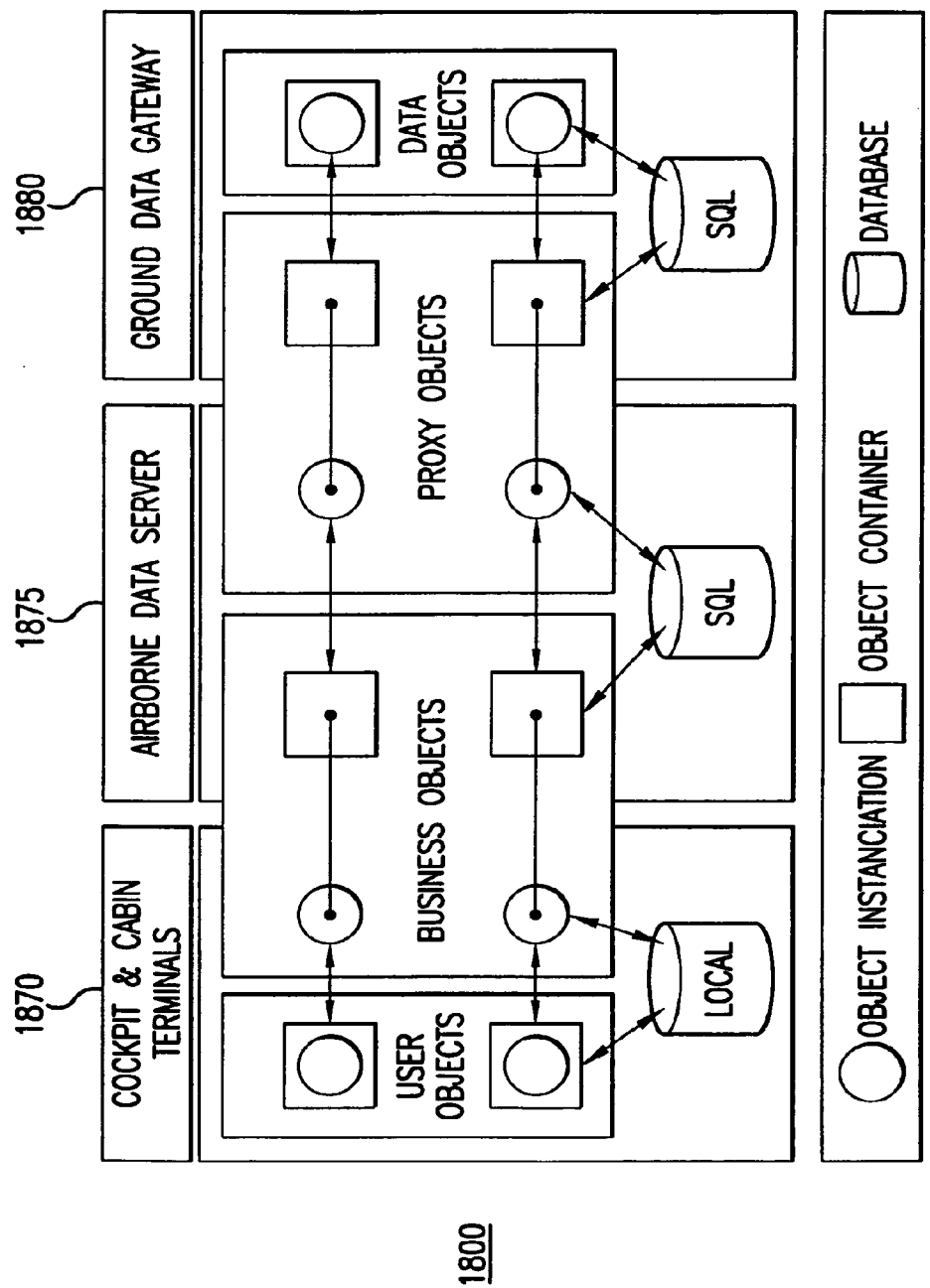
FIG. 16 is a block diagram of an alternative software infrastructure for the data communication server in accordance with an embodiment of the present invention.

FIG. 16 illustrates an exemplary configuration for the software architecture 1800 for an end-to-end system between the cockpit and cabin terminals 1870, airborne data server 1875, and ground data gateway 1880.

The sports scores admin server 1710 allows a system administrator to perform a plurality of functions including starting/terminating the sports scores service, changing the property of each active instance and the default property of the service, changing the automatic update schedule using the sports scores retriever 1715 control, and initiating an on-demand update using the sports scores retriever 1715 control. Additionally, the admin server 1710 maintains the database that contains all the sports scores records wherein advantageously the client API can be allowed access to database records with "read" permission only, and both the admin server 1710 and the retriever 1715 have full control over the records.

The sports scores retriever 1715 advantageously can have access to both the sports scores database and the sports scores locator database. The retriever 1715 can use the information in the locator database to construct the SQL queries, such as the token representing the records desired, the SQL server location, and the property of the records, and other information to retrieve the sports scores records. The retrieved information will be written to the sports scores database, and a proper event will be sent back, either to the client 1705 or the admin server 1710, to inform the availability of the updated records. Additionally, a GUI will be available to a system administrator to perform a plurality of functions including initiating a complete on-demand update, initiating a partial on-demand update based on the client property forwarded, allowing modifications to the automatic update schedule, and changing the locator database records.

FIGS. 17-19 provides a representative example of the administration, client, and retriever control properties of the server control part of the API categorized by property name, type, allowable value, and comment.

In practical operation, the client requests services via methods. Advantageously, a generic method may be created but with different properties to differentiate various services requests, or different methods may be created to represent different requests. FIGS. 20-21 provides a representative example of the different server-side and client-side methods that can be created for the sports scores API.

Additionally, clients can request an object to send notification in case a specific event has occurred. Advantageously, the client is notified of an event in the form of executing the call event function on the client side. For the exemplary sports scores API, there are two events that can be required, one for indicating the successful completion of "method" execution, and another for indicating when the "method" execution failed. Optionally, an error code may be used as part of the event to indicate the cause of the failure.

Referring again to FIGS. 15, 17-21, an illustrative example of how sports scores AP invokes the data communication server's sports scores service and the actions performed as characterized by properties and methods are shown.

Initially, for the "client requests for scores" action 1706, the user can select the desired options on the property menu via the GUI and demand an unconditional update (see FIG. 22). Then, for the "server retrieves data requested" action 1707, the server-side Sports Scores API 1712 reviews the client-controlled property (see FIG. 19) and initiates an SQL query of the sports scores table via the SQL Manager SS to verify that data is up-to-date. For this example, the SQL query suggest that the data requested is out-of-date. Next, in the "server requests for updates" action 1708, the server-side sports scores API 1712 demands an update (see FIG. 21) which invokes the sports scores retriever SS server 1715 control using the retriever control property (see FIG. 20). Then, for the "retriever initiates SQL-based scores retrieval" action 1709, the sports scores retriever SS component 1715 invokes SQL Manager control to query the sports scores locator records for detailed instructions to initiate an SQL-based data query (e.g., SQL script ID). Then, the retriever 1715 instructs the SQL Manager to retrieve the required data records. Then, for the "low-level SQL queries and retrieval" action 1711, the SQL Manager initiates queries by establishing an SQL port, TCP or UDP, connection to the SQL server inside the GDG 1720.

The request can be wrapped by the IP Stack SS 1735 and can be sent to the proper BRI SR 1725 that has the connection to the desired bearer via the routing table lookup. The SQL query requests that an IP packet be delivered to the GDG 1720 where corresponding TCP/UDP ports are being used for accepting the SQL connections. Advantageously, the SQL server on the GDG 1720 returns the results of the query back to the database SS 1722. The sports scores retriever 1715 receives an event notification of the completion of the query.

For the "sports scores retriever notifies server of task completion" action 1713, the sports scores retriever sends a completion event to the Server by executing a call-back function. Then, for the "server reads database records" action 1714, the server API, embedded as part of the call back function, contacts the database manager for the requested sports scores wherein the retrieved data is delivered to the client side sports scores API object 1705. Then, for the "client reads scores" action 1716, the client-side API 1705 receives the completion event and retrieves the data delivered by the server-side API 1712 wherein the results (updated sports scores) are presented to the user via the client GUI controls.

Applications

Several applications are enabled by the data communications system architecture including aircraft operations applications, cabin applications for aircraft personnel, and passenger applications. Advantageously, many of the applications use a display observable to the aircraft crew or passenger to display requested or automatically generated information (e.g., catalog of products or services) via the data communication server, and provides for delivering information (e.g., credit card) to facilitate a purchase. Operations applications are intended to increase the operational efficiency of the airline flight crew, flight operations, department, and/or maintenance department in the operation and maintainability of the aircraft. Operations applications can include, but are not limited to, electronic library systems (ELS)/electronic logbook, flight operations quality assurance (FOQA), engine data, performance reports (V1 speeds, rotation angle), aircraft position, out, off, on, in (OOOI)/flight phase reports, and data loader. Further operations applications may include aircraft condition monitoring system, fault reports, gate assignment, weight data, departure reports/pre-flight briefings, clock synchronization, delay reports, gate requests, ACARS, crew scheduling, and weather.

The ELS/electronic logbook provides a paperless environment for the aircraft crew to manage aircraft operations. The system includes reference to on-line manuals and guides and provides an electronic mechanism for items requiring logbook entry. Logbook entries can be automatically sent to the aircraft operations center for an updated copy of the logbook system, this copy serving as a backup to the electronic copy kept on the aircraft system.

FOQA is an FAA-sponsored program to increase aircraft flight safety via monitoring aircraft and pilot performance through the various data supplied by the aircraft sub-systems. The data can be stored on-board the aircraft and delivered at a later date to aircraft flight operations or can be delivered real-time via the data communications server. The engine data application can include real-time delivery of engine performance data to the aircraft operations center, obtainable via the ACARS MU or via the ARINC-429 bus connected to an engine electronic controller (EEC). Performance reports may include monitoring of pilot actions during critical phases of flight such as takeoff and landing to provide the flight operations input for corrective actions in training programs or technical literature. Additionally, data analysis used to maximize flight performance may include monitoring of such data as actual vs. calculated V1 speeds, angle of rotation, flap deployment, and angle of ascent/descent.

Real-time aircraft position is used by the aircraft operations center to track the aircraft and provide real-time feedback for performance monitoring and route adjustments to pilots. Advantageously, the data communications server may obtain position information from an on-board positioning system (e.g., global positioning satellite) and route that information to the aircraft operations center. Other applications use the data communication server to provide the requested data.

Cabin applications can be advantageously intended to increase the operational efficiency of the aircraft cabin crew and/or maintenance crew. Cabin applications can be also intended to provide new passenger services or more efficient use of existing passenger services. Cabin applications can include, but are not limited to, connecting gates/delay reports, duty-free shopping (allowing aircraft personnel to validate credit purchases of duty-free goods via a card reader), frequent flyer/customer profile, on-board inventory, systems information and troubleshooting, departure reports/pre-flight briefings, FA communication system, flight attendant comments tracking system (FACTS), email, cabin discrepancy log (CDL), catering reports (allowing user pre-selected catering services), and baggage/asset tracking. Baggage/asset tracking can be advantageously implemented using the data communication server in combination with an RFID tag system (e.g., integrated into baggage tags) to track and locate aircraft baggage and assets. The RFID tags could be read with RF readers for tracking and identifying of baggage and assets, including a data link (e.g., Ethernet) to the data communication server for processing.

Passenger applications are intended to provide a more comfortable, convenient aircraft experience for the passenger (user). Passenger applications can advantageously include, but are not limited to, transaction processing, sports scores as described herein, connecting gates/delay reports, service selections, reservation system access, messaging service, marketing tracking, surveys/comments, shopping, email, advertising, on-line services as described herein, passenger inflight information (PII), GTA registration for telephony services, and medical information.

Although the invention is described herein using the NATS network as a primary bearer service for an aircraft data communication service, it will be appreciated by those skilled in the art that modifications and changes may be made without departing from the spirit and scope of the present invention. As such, the method and apparatus described herein may be equally applied to any bearer service providing data communication services for a user from any moving object.

What is claimed:

1. A processor readable storage medium that is not a propagating signal, the processor readable storage medium having stored thereon executable instruction that when executed by a processor perform operations comprising:
    initiating a radio communication path via system resources layer components that communicate with systems services layer components, the system resources layer components including a device driver for data exchange between a moving object and a first ground station, wherein the system services layer components provide system level services to objects of an application programming interface layer;
    initiating a connection between the first ground station and a second ground station;
    transmitting data including operational data of the moving object using system services layer components from the moving object to the first ground station via the radio communication path; and
    facilitating transmission of data from the first ground station to the second ground station via the connection between the first ground station and the second ground station.

2. The processor readable storage medium of claim 1, wherein the connection between the first ground station and the second ground station is formed at least in part by a public switched telephone network.

3. The processor readable storage medium of claim 1, further comprising initiating an end-to-end link layer connection between the communication server and a terminal node.

4. The processor readable storage medium of claim 1, wherein data packets are modulated onto a radio frequency and sent to the first ground station via the radio communication path.

5. The processor readable storage medium of claim 4, wherein the data packets are sent from the first ground station to the second ground station via a frame relay network.

6. The processor readable storage medium of claim 1, wherein a point-to-point protocol frame is tunneled from the communication server to the second ground station via a layer two tunneling protocol.

7. A processor readable storage medium that is not a propagating signal, the processor readable storage medium having stored thereon executable instructions that when executed by a processor perform operations comprising:
    from an aircraft communications server, transmitting data packets comprising data related to operational data of an aircraft from an application of an applications layer of a software architecture implemented on the aircraft communications server according to a point-to-point protocol to a ground-based network, wherein the transmitting comprises transmission via multiple radio links, and wherein a point-to-point protocol frame is tunneled from the aircraft communications server to a ground data gateway via a tunneling protocol; and
    receiving data packets at the aircraft communications server via a satellite uplink according to access controls provided by system services layer components according to the software architecture, wherein the system services layer components exchange data with onboard aircraft avionics using a device driver.

8. The processor readable storage medium of claim 7, wherein the ground-based network includes a North American Terrestrial System network.

9. The processor readable storage medium of claim 7, wherein the ground-based network includes the Internet.

10. The processor readable storage medium of claim 7, wherein the aircraft communications server includes object-oriented software.

11. A system comprising:
    memory having stored thereon executable instructions; and
    a processor coupled to the memory, the processor configured to execute the executable instructions to perform operations comprising:
        initiating a radio communication path via system resources layer components that communicate with systems services layer components, the system resources layer components including a device driver for data exchange between a moving object and a first ground station, wherein the system services layer components provide system level services to objects of an application programming interface layer;
        initiating a connection between the first ground station and a second ground station;
        transmitting data including operational data of the moving object using system services layer components from the moving object to the first ground station via the radio communication path; and
        facilitating transmission of data from the first ground station to the second ground station via the connection between the first ground station and the second ground station.

12. The system of claim 11, wherein the connection between the first ground station and the second ground station is formed at least in part by a public switched telephone network.

13. The system of claim 11, further comprising initiating an end-to-end link layer connection between the communication server and a terminal node.

14. The system of claim 11, wherein data packets are modulated onto a radio frequency and sent to the first ground station via the radio communication path.

15. The system of claim 14, wherein the data packets are sent from the first ground station to the second ground station via a frame relay network.

16. The system of claim 11, wherein a point-to-point protocol frame is tunneled from the communication server to the second ground station via a layer two tunneling protocol.

* * * * *